United States Patent [19]

David

[11] Patent Number: 4,569,819
[45] Date of Patent: Feb. 11, 1986

[54] PULSED NUCLEAR POWER PLANT

[76] Inventor: Constant V. David, 4952 Field St., San Diego, Calif. 92110

[21] Appl. No.: 586,830

[22] Filed: Mar. 6, 1984

[51] Int. Cl.[4] .......................... G21B 1/00; G21J 00/00; G01J 00/00
[52] U.S. Cl. .................................... 376/273; 376/101; 376/102; 376/150; 376/152; 376/260; 376/276
[58] Field of Search ............... 376/101, 102, 125, 152, 376/150, 260, 273, 276

[56] References Cited

U.S. PATENT DOCUMENTS

| 3,864,208 | 2/1975 | Van Huisen | 376/276 |
| 3,921,405 | 11/1975 | Rosciszewski | 376/276 |
| 3,967,215 | 6/1976 | Bellak | 376/102 |
| 3,972,688 | 8/1976 | Cornelius et al. | 376/287 |
| 4,053,359 | 10/1977 | Pennell et al. | 376/302 |
| 4,121,969 | 10/1978 | Marwick | 376/102 |
| 4,216,058 | 8/1980 | Marwick | 376/102 |
| 4,228,380 | 10/1980 | Wells | 376/125 |
| 4,292,568 | 9/1981 | Wells et al. | 376/125 |
| 4,344,911 | 8/1982 | Maniscalco et al. | 376/150 |
| 4,344,913 | 8/1982 | Marwick | 376/102 |

OTHER PUBLICATIONS

Scientific American, Non-Military Uses of Nuclear Explosives, Dec., 1958, vol. 199, No. 6, pp. 29-35.
Exploding Reactors for Power, Edward F. Marwick, 1973, pp. 1-36.
Anon, Research Disclosure, No. 124, Aug. 1974, p. 30.

*Primary Examiner*—Deborah L. Kyle
*Assistant Examiner*—Richard W. Wendtland

[57] ABSTRACT

A spherical underground cavity is filled with saturated steam or a mixture of saturated steam and coal dust in which a nuclear device is detonated to provide the source of energy. The energy thus released heats the saturated steam to produce superheated steam used to generate power. If coal dust is mixed with the saturated steam in the correct ratio, the rise in temperature caused by the nuclear explosion initiates a chemical reaction between the steam and the coal to produce carbon monoxide and hydrogen. The mixture of carbon monoxide and hydrogen can be used as fuel in an external power plant. The carbon monoxide and the hydrogen gases can also be separated for use as fuels or for industrial applications. The wall of the spherical underground cavity is isolated from the shock wave created by the nuclear explosion in the ambient saturated steam by a segmented steel shell. Each segments is supported by a shock absorbing mechanism attached to the rocks in which the cavity is embedded. After the explosion, the steel shell segments move outward, are slowed down and stopped by the shock absorbing system. No shock is transmitted to the surrounding rocks. The shell segments are eventually returned to their initial position and readied for the next explosion. After enough superheated steam has been extracted out of the cavity, water and saturated steam are again injected inside the cavity, to restore the initial ambient conditions that existed prior to the preceding explosion. When the conditions inside the cavity are right, another nuclear device is introduced, then detonated and another cycle is started. The explosion cycle frequency is established by the size of the cavity and the yield of the nuclear device. Most, and possibly even all, of the energy thus generated is produced by a nuclear reaction of the fusion type. Means is thereby provided to produce energy and possibly more fuels by utilizing the inexpensive and plentiful fuel deuterium. If a fission reaction is not used to trigger the fusion reaction, tritium may need to be added to the deuterium so that a powerful laser beam can be used to provide the triggering means.

19 Claims, 24 Drawing Figures

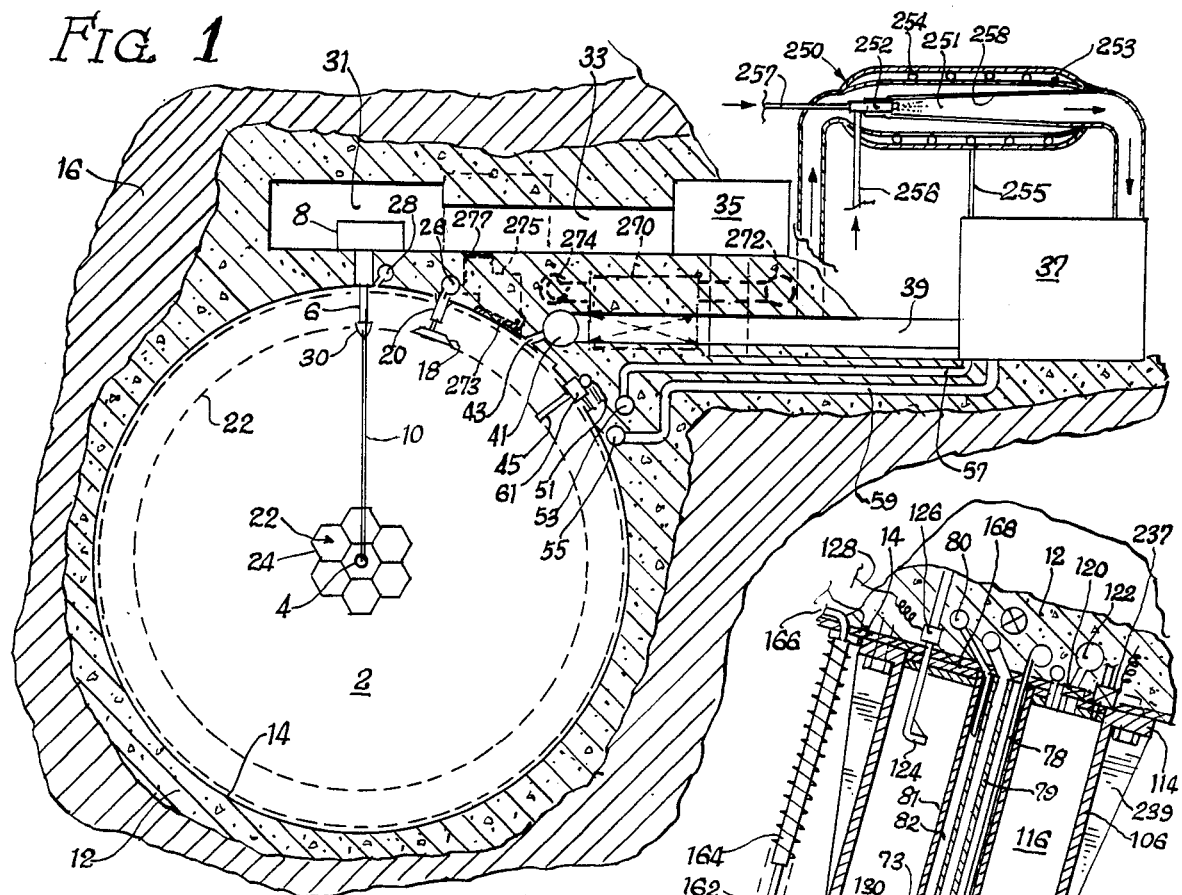
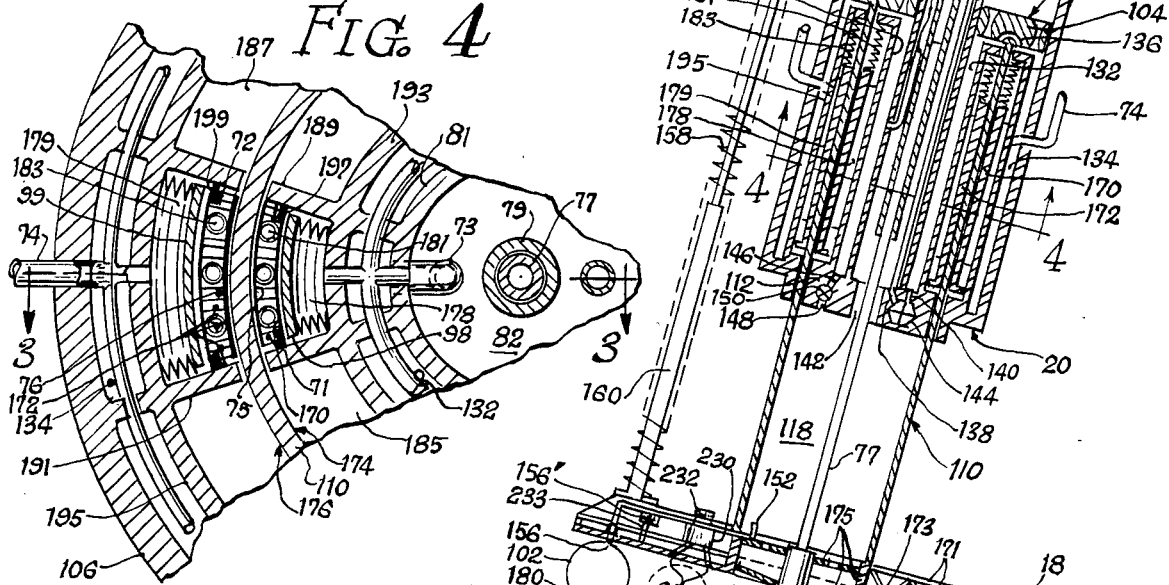
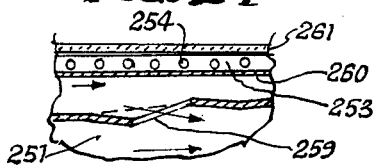

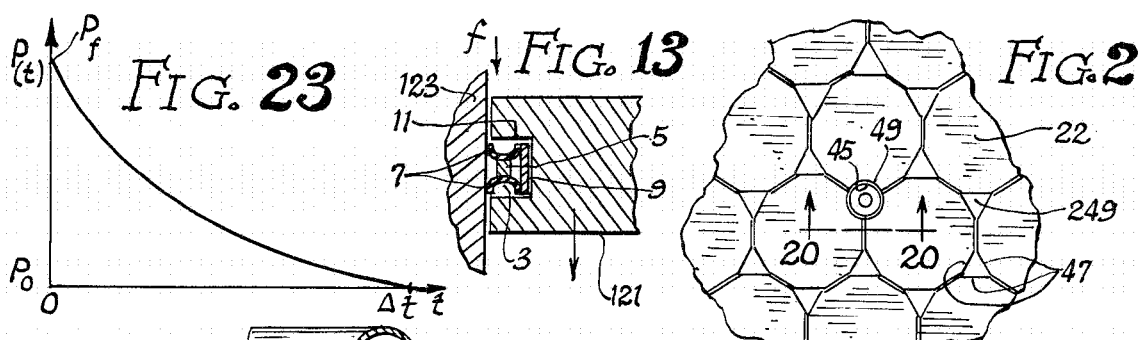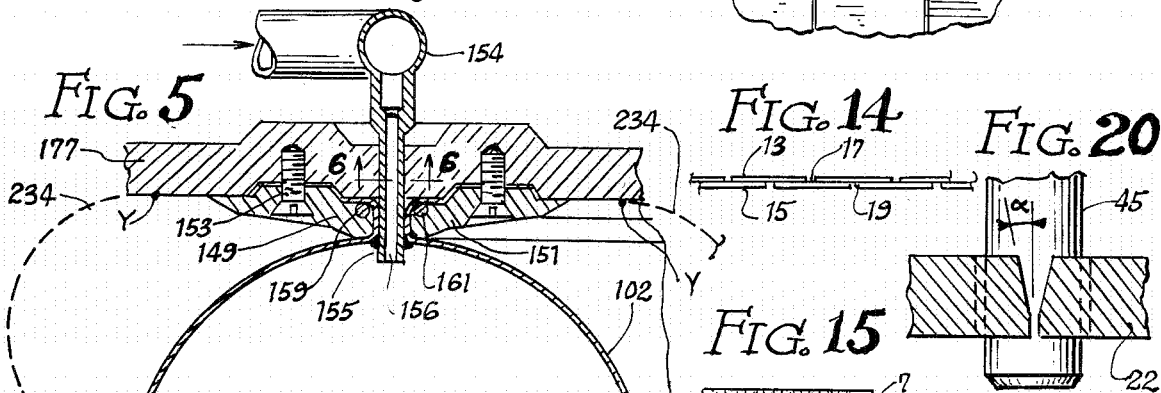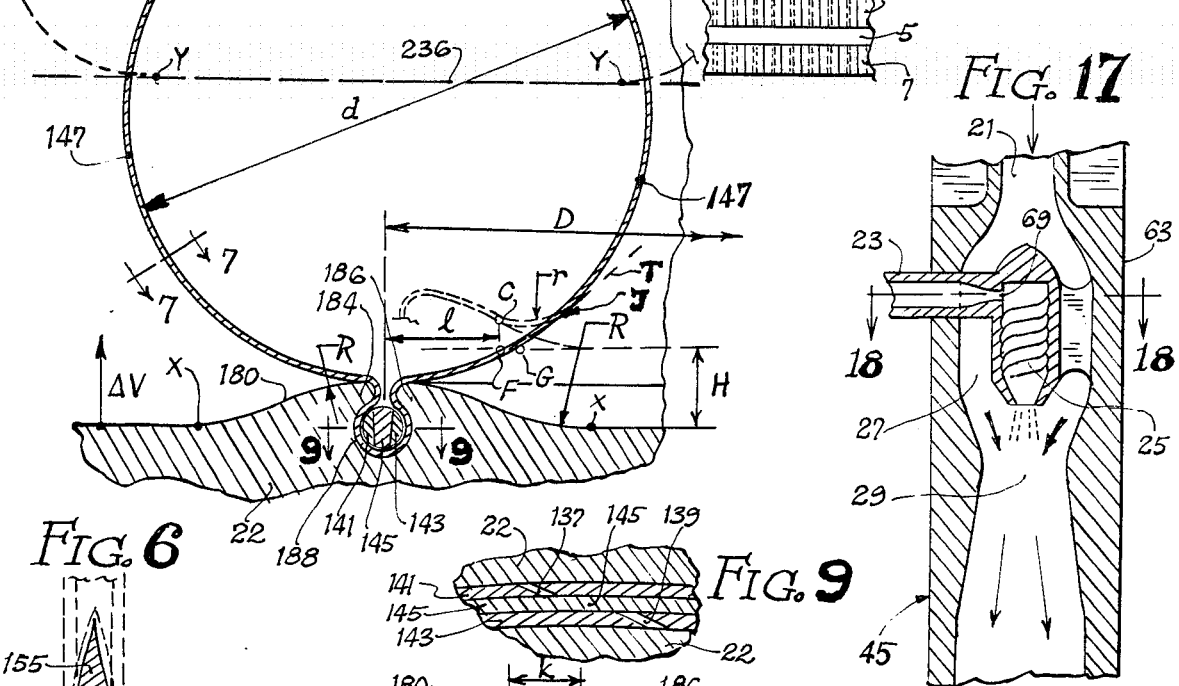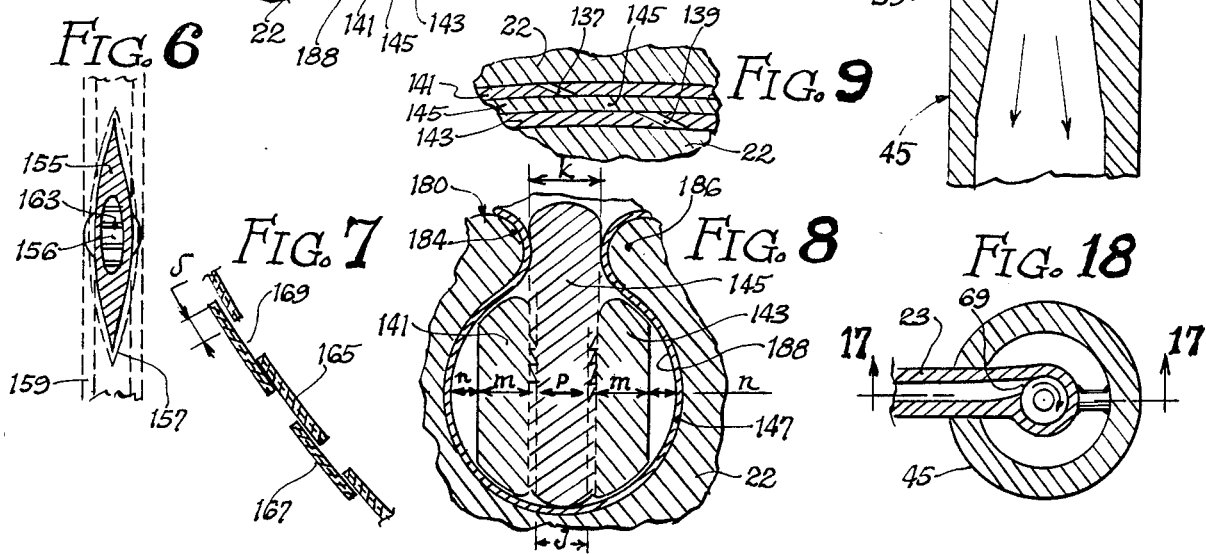

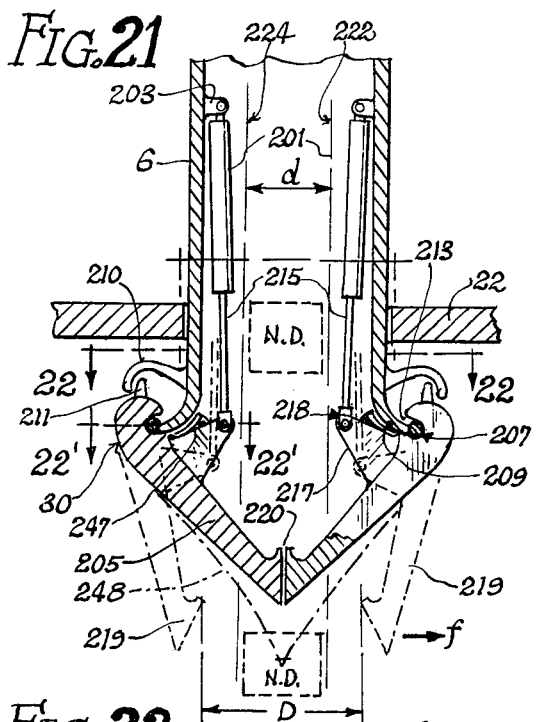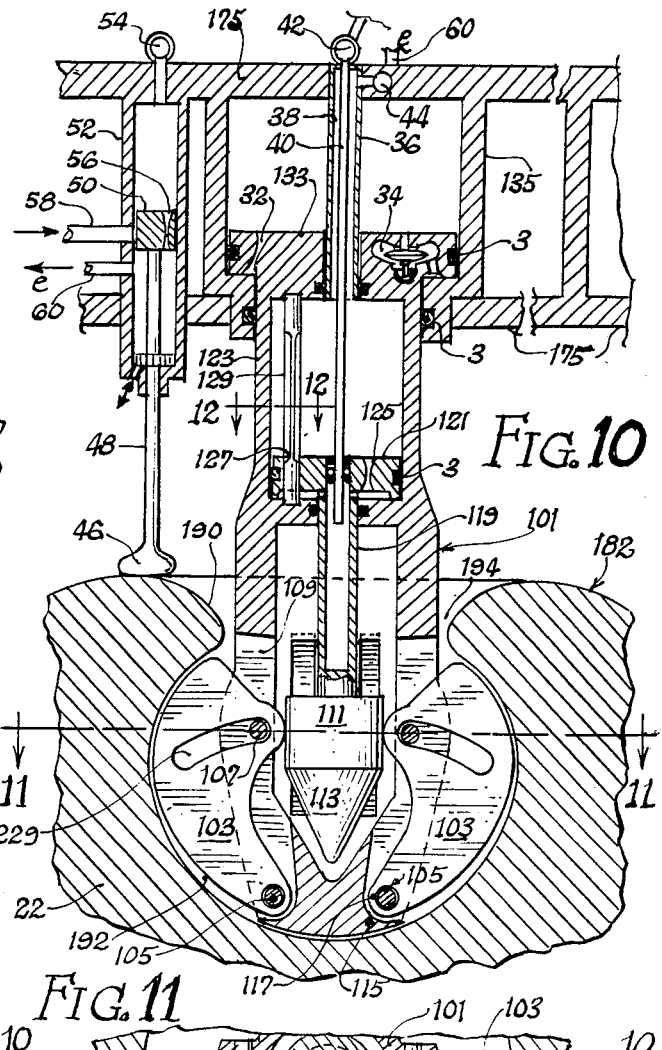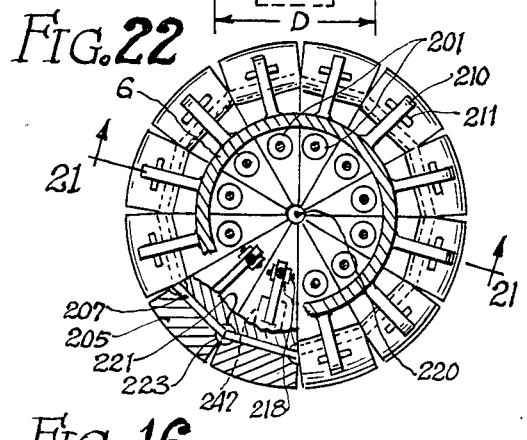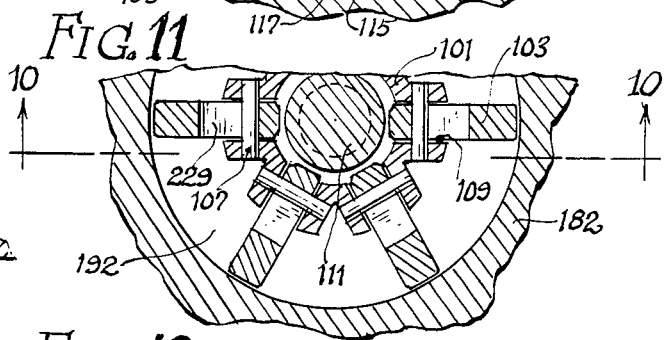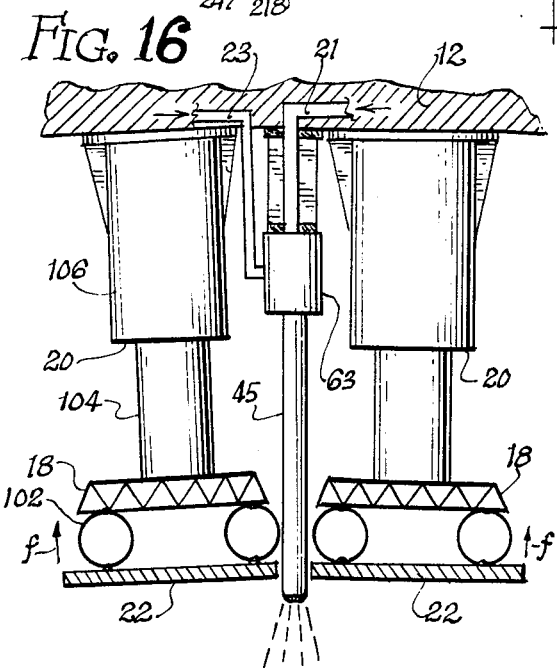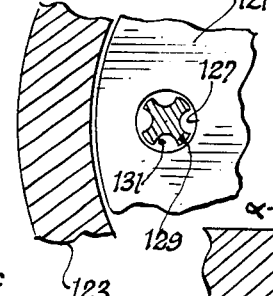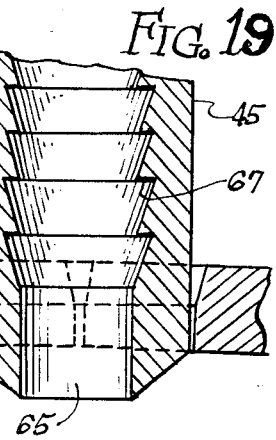

PULSED NUCLEAR POWER PLANT

BACKGROUND OF THE INVENTION

The present invention relates to an energy producing plant in which the source of energy is a nuclear reaction of the fusion or fission/fusion types, and more particularly, to a power plant in which the nuclear reaction is of an explosive nature and in which nuclear devices are exploded repeatedly during the natural lifetime of the power plant.

For almost half of a century, energy has been produced by and extracted from nuclear fission reactions in a slow controlled process in various types of nuclear reactors. More recently, attempts have been made to control and extract energy from nuclear fusion reactions on a very small experimental scale. In this type of reactions, steady state operation is not contemplated and only a pulsed type of operation seems feasible. Other attempts have been made to use fission or fission/fusion nuclear devices on much larger scales to generate energy that could be harnessed for continuous usage. A device is exploded underground in a rock formation (old salt mine for example). Large amounts of rocks are vaporized, melted, broken down and heated. All these debris become very hot, but also very radioactive. Water under pressure is injected in the cavity thus formed. Heat is transferred from the hot rocks to the water. Superhated steam at high pressure is generated. This steam can then be used as a source of external energy. It is easy to understand why such a process can be used only once for each site. This approach does not offer a viable solution, it is inherently impractical.

The practical and economical use of pulsed fusion systems appears to be between 25 to 50 years in the future, depending upon the expert consulted. The use of fusion nuclear reactions, however, is very appealing: the fuel source is practically inhexaustible, the fuel is inexpensive, the fusion reaction produces less objectionable radioactive by-products than fission per unit of yield. Therefore, it seems desirable to take advantage of fusion nuclear reactions, if they can be safely and reliably combined with state-of-the-art engineering techniques which could allow the elimination of the major problem of plasma containment, which is the stumbling block of all fusion concepts now under study. Preferably, this is accomplished by isolating the nuclear explosion side effects from the mechanical hardware that contains the explosion debris and the working fluid used in the energy transfer process. The repeated use of the hardware and of the installation then becomes possible.

SUMMARY OF THE INVENTION

It is therefore a primary object of the present invention to provide a nuclear power plant for extracting energy from the heat generated by underground nuclear explosions.

It is another object of the present invention to provide a nuclear power plant which allows to maximize the use of fusion-type nuclear reactions.

It is another object of the present invention to provide a nuclear power plant in which the energy extracted can be either directly usable to produce power, OR available in the form of chemical fuels for transportation and use elsewhere, OR available to produce raw chemical materials and the energy needed to produce synthetic liquid fuels and/or plastics.

It is still another object of the present invention to provide a nuclear power plant which can withstand numerous nuclear explosions repeatedly and have a natural lifetime similar to that of the conventional power plants now in general use.

Accordingly, the present invention provides underground cavities with walls that are isolated and protected from the radiations and the shock waves generated by repeated nuclear explosions. This isolation of the cavity walls is achieved by having, firstly, enough materials between the point of detonation and any surrounding hardware and, secondly, a shock absorbing system attached to the cavity walls to dampen the impact of the shock waves. Means are provided to introduce the working fluid, which acts first as shielding material, and the nuclear device sequentially, and to extract the hot gases resulting from the nuclear device explosion, in a programmed and controlled manner.

DESCRIPTION OF THE DRAWINGS

FIG. 1 is a simplified midsectional side elevation of the pulsed nuclear power plant.

FIG. 2 is a partial view of the metal plate shell seen from the center of the spherical cavity.

FIG. 3 is a midsectional side elevation of one typical metal-plate/platform/shock-absorber assembly.

FIG. 4 is a partial sectional view taken along line 4—4 of FIG. 3.

FIG. 5 is a partial enlarged detailed sectional view of the toroidally-shaped vessel of the first stage of the shock absorbing system shown in FIG. 3.

FIG. 6 is a partial sectional view of a typical pressure-inlet/seal assembly taken along line 6—6 of FIG. 5.

FIG. 7 is a partial enlarged sectional view of the wall of the pressurized toroidally-shaped vessel taken along line 7—7 of FIG. 5.

FIG. 8 is a partial detailed enlarged sectional view of the metal plate clamping arrangement shown in FIG. 5.

FIG. 9 is a partial detailed enlarged sectional view taken along line 9—9 of FIG. 5.

FIG. 10 is a detailed midsectional side elevation of the plate/platform clamp arrangement shown in the clamped position.

FIG. 11 is a sectional view taken along line 11—11 of FIG. 10.

FIG. 12 is a partial sectional view taken along line 12—12 of FIG. 10.

FIG. 13 is a detailed partial enlarged sectional view of a typical piston sealing arrangement.

FIG. 14 is a detailed partial end view of a typical metallic seal arrangement.

FIG. 15 is a partial side view of a typical metallic seal arrangement.

FIG. 16 is a side elevation of two contiguous plate/shock-absorber assemblies and of a fluid injection system.

FIG. 17 is a partial midsectional side elevation of the water/steam mixing means of the fluid injection system shown in FIG. 16 and taken along line 17—17 of FIG. 18.

FIG. 18 is a sectional view taken along line 18—18 of FIG. 17.

FIG. 19 is a partial midsectional side elevation of the end of a working fluid injection tube.

FIG. 20 is a side elevation of the end of a working fluid injection tube.

FIG. 21 is a midsectional side elevation of the nuclear device delivery tube taken along line 21—21 of FIG. 22.

FIG. 22 is a combination of a partial sectional view taken along line 22—22 of FIG. 21, and of an external end view of the delivery tube shown in its closed position.

FIG. 23 is a diagram showing a typical variation of static pressure in the shock wave as a function of time.

FIG. 24 is a partial enlarged sectional view of the water reduction system shown at the top of FIG. 1.

DETAILED DESCRIPTION OF THE INVENTION

Referring to the drawings of FIG. 1, the pulsed nuclear power plant generally comprises a large underground spherical cavity 2 that contains the fluid to be heated by the energy released by the explosion of a nuclear device 4 positioned at the center of cavity 2. The fluid contained in cavity 2 and which surrounds nuclear device 4, before the explosion, consists, in one instance, of saturated steam, and in another instance, of a mixture of saturated steam and fine coal powder. After the explosion of nuclear device 4, within a fraction of a second, the cavity contains, in the first instance, only superheated steam, and in the second instance, a mixture of superheated steam, hydrogen gas and carbon monoxide gas. Prior to its detonation, nuclear device 4 is inserted in cavity 2 through delivery tube 6 located below delivery chamber 8 where the upper end of holding and positioning linyward 10 is secured. Linyard 10 also supports the electrical lines needed to monitor nuclear device 4 and control its detonation. Walls 12 of cavity 2 are lined with a steel shell 14 that rests against the concrete structure of wall 12. This concrete structure is solidly anchored in the supporting rock formation 16 that constitutes the holding infrastructure. A plurality of shock absorbing structures 18 supported by shock absorbers 20 are mounted on and solidly affixed to shell 14 and wall 12. At rest and before the detonation of the nuclear device, a plurality of steel plates 22 attached to shock absorber structures 18, but not directly connected to one another, form another segmented shell, concentric with cavity wall 12. These plates receive the initial impact of the first shock wave generated by the nuclear device explosion. They initially then isolate shell 14 and wall structure 12 from such high intensity shock. Plates 22 are "hexagonally" shaped, but their "sides" 24 are slightly curved to conform to the sphericity of their assemblage and to prevent any interference between plates sides. This is possible because the size of each plate is quite small compared to cavity 2 radius. For all practical purpose, the curvature of the plates sides can be ignored from now on. The corners of the plates are chamfered for reasons made clear later.

The present invention, as depicted in FIG. 1, further comprises a service chamber 31, located around delivery chamber 8, connected by service tunnel 33 to operations room 35 from which the plant operation is conducted, monitored and controlled. Power plant 37 houses the machinery and equipment required to extract energy from the heated fluid brought in by channel 39 connected to collecting ducts 41 which receive the heated fluid from a plurality of pick up vents located at various points on shell 14. The fluid to be heated is brought into cavity 2 by a plurality of injection tubes 45 that exit at various locations where the corners of plates 22 meet, as shown in FIG. 2. The other corners of the hexagons are cut off to form triangular openings such as 47 of FIG. 2. The hexagon corners cut off to accommodate injection tubs 45 are shaped to form circular openings such as 49. The working fluid (liquid to be heated) is distributed to injection tubes 45 by a plurality of manifolds 51 connected to fluid feed ducts 53 and 55 that receive this fluid from power plant housing 37 by means of pipelines 57 and 59. A control valve 61 monitors the fluid admission into cavity 2. Shock absorbers 20 are serviced by a plurality of tubes and electrical lines located inside duct 26. The opening and closing mechanism 30 of delivery tube 6 receives its signals and actuating power by means of channels 28.

The shock absorbers used in conjunction with shock plates 22 constitute one of the most important feature of the present invention and are described in FIGS. 3 to 15. They incorporate two stages: (1) an assembly of flexible toroidal tubes 102 attached to structures 18 and clamped on plates 22; (2) a laterally rigid telescoping set of piston 104 and cylinder 106 which permits an axial motion of plate-22/toroidal-tube-102/structure-18 assembly. Piston head 108 slides up and down inside cylinder 106 and is mounted on piston hollow stem 110 which is rigidly connected to intermediate structure 18. Piston stem 110 is guided and laterally restrained by bottom end 112 of cylinder 106 that is bolted by means of flange 114 to steel shell 14 and cavity 2 wall 12. Both piston stem 110 and cylinder 106 contain high pressure steam. When structure 18 and piston stem 110 move up, this steam is compressed in both chambers 116 and 118, thereby providing the arresting action needed by plate 22 and transmitted by toroidal tubes 102. The flow of compressed steam in and out of chamber 116 is regulated by valve 120 connected to steam manifold 122 which connects all shock absorbers. Toward the end of its upward travel, piston head 108 contacts motion sensor 124 so that piston head 108 position and velocity can be detected and monitored by means of displacement detector 126 which is connected to the appropriate monitoring equipment in operation room 35 by electrical lines 128. Both sides of piston head 108 are connected by restricting orifices such as 130 so that, when piston head 108 is still, the steam pressures acting on each side of piston head 108 can slowly equalize.

Chambers 132 and 134 below piston head 108 are connected by a plurality of holes 136, all located inside piston head 108. Chambers 132 and 134 communicate with chamber 118 volume inside piston stem 110 by means of channels 138, 140 and 142. Control valve 144 is located between channels 138 and 140. Another set of channels 146 and 148, connected through control valve 150, allows chamber 132 to communicate directly with piston stem chamber 118. Tube 152 connects chamber 118 with manifold 154 which feeds compressed steam inside toroidal tubes 102 through openings 156. Control valve 156' mounted on tube 152 is connected to operation room 35 by means of conduit 158 which is helically wound around telescoping tubes 160,162 and 164 for lateral support. Conduit 158 wall has the characteristics of a spring. Its coils can move up and down to accommodate the displacements of intermediate structure 18 and maintain their relative distances when structure 18 is still. The only purpose of this springlike conduit is to channel the electrical lines needed for the control of the operation of valves 156 and 230, and which emerge through conduit 166. Structure 18 is built to combine rigidity and light weight. It comprises a truss 171 affixed to both a honeycomb panel 173 and a circular-hoop-and-dome box assembly 175 mounted on and fixedly attached to the bottom part of piston stem 110. The other side of panel 173 is solidly affixed to support plate 177 which receives the compressive reaction of toroidal tubes 102 when shock plate 22 moves upward.

Although one face of plate 22 is flat, the other face is not. It features circular bosses 180 and one central boss 182. Circular bosses 180 have two lips 184 and 186 in order to partly enclose circular clamping groove 188 which holds the bottom surface of toroidal tubes 102. Central boss 182 has only one circular lip 190 which partly encloses spherical cavity 192 and provides round opening 194. When required, locking head assembly 101 is held inside cavity 192 as shown in FIG. 10, at which time shock plate 22, structure 18 and piston assembly 104 become rigidly connected and behave dynamically as one single mass. As this mass moves up (in FIG. 3), it is stopped before piston head 108 reaches the top end 168 of cylinder 106. At that time, the steam pressure in chamber 116 is still higher than that in chambers 132 and 134 (and even 118). As piston head 108 starts moving back down, sets of brake shoes 170 and 172 are brought in contact with inside and outside surfaces 174 and 176 of piston stem 110 cylindrical wall by means of the combined action of bellows 178 and 179, and springs 181 and 183, all located inside brake chambers such as 185 and 187. These brake chambers are contained within stiffening ribs such as 189 and 191 attached to structural cylindrical walls 193 and 195, which act as bellows 178 and 179 back ends and supports. Stops 197 and 199 are solidly attached to ribs 189 and 191 and fit inside recesses 71 and 72 cut in brake shoes 170 and 172. The contact surfaces between brake shoe cuts 170 and 172, and stops 197 and 199 are flat but make a slight angle with respect to shock absorber 20 axis in order to provide a wedge effect. This wedge effect alters the interaction between bellows 178 and 179, and brake shoes 170 and 172 to insure either braking action or no braking action on cylindrical piston stem 110 wall, depending only and automatically on the direction of the piston stem movement. Pressure inside bellows 178 and 179 is applied through pressure lines 73 and 74. Brake shoes 170 and 172 are equipped with linings 75 and 76. The actuating ends of bellows 178 and 179 are curved rigid plates 98 and 99, shaped to fit the brake shoe contours.

FIG. 3 also illustrates the means by which steam pressure lines and electrical conduits are channelled from cavity 2 wall to points inside shock absorber 20 where such steam pressures and electrical signals and power are needed. Such means comprise a telescoping set of tubes 77 and 79 for the operation and control of locking head 101, electrical conduit 78 for the control of valves 144 and 150, pressure manifold 80 for pressure lines 73 and 74, inner cylinder 81 that contains inner chamber 82 and which connects with chamber 118. Bottom end 112 of shock absorber 20 is solely supported by inner cylinder 81, thus fulfilling a major structural function.

Referring to FIGS. 5 and 6, a cross-section of toroidal tube 102 shows how it is attached to the supporting structures and the means used to keep the tube pressurized. The attachment means include, at the bottom, spacer rings 141 and 143 separated by locking key ring 145 to secure wall 147 of tube 102 inside groove 188 by means of the restraining action of lips 184 and 186. At the top, ring clamps 149 and 151 are bolted to structure 177 by screws 153. The pressurizing means comprise a plurality of tubes 155 shaped to conform to the local deformation imposed on wall 147 at its upper clamping location. Apertures 157 in structure 177, shaped to fit the external surface of tube 155, are cut at intervals. A sealing bead 159, located in these intervals between tubes 155, shaped to fit inside the gap formed by clamps 149 and 151, structure 177 and tubes 155, is pushed by the pressure inside toroidal tube 102 against structure 177. O-rings 159 and 161 located between clamps 149 and 151, and flexible wall 147 further insures physical compliance of all the parts in contact. The inside 156 of tubes 155 has reinforcements such as 163 to prevent any local flattening of tubes 155. Because of the high temperature and radiation levels to which all parts are subjected, the use of only metallic parts can be contemplated here. However, the wall 147 of tube 102 must be flexible, locally deformable, laterally extensible and as gas tight as possible. This is achieved by using a plurality of thin metallic bands 165 and 167, as shown in FIG. 7, shaped and sized to overlap at all times. The pressure inside toroidal 102 is always higher than the outside pressure, further, inner bands 165 metal has a Young modulus of elasticity lower than that of the metal used for outer bands 167. In such an instance, both inner and outer bands have the same thickness. If the same metal were used for both types of bands, the inner bands could be thinner than the outer bands. Either design approach insures that, for equal tension loading levels, the inner bands tend to stretch more than the outer bands. This assures permanent contact between inner and outer bands, so that sealing is always insured. Each metallic band consists of several layers of ultra thin foils coated with dry lubricating means so that local bending of the bands can take place when required without creating excessive stress levels in the metal, so that the elastic range of the metal strain is never exceeded. As an example, steel alloys can be used for the outer bands and titanium alloys can be used for the inner bands. Gaps 169 and overlaps $\delta$ are both wide enough to allow the maximum lateral swelling of the cross-section shown in FIG. 5 and which corresponds to plate 22 maximum travel upward with respect to structure 177.

Referring to FIGS. 8 and 9, the locking of wall 147 inside groove 188 is achieved before the upper part of wall 147 is clamped, during assembling. Spacer rings 141 and 143 have cuts 137 and 139 which permit their deformation so that they can be introduced inside groove 188 after bands 165 and 167 are in place. Circular indentations on the inner surface of spacer ring 141 and on the outer surface of spacer ring 143 match similar indentations present on both lateral surfaces of locking key ring 145. Both lateral surfaces are slightly inclined (dimension j smaller than dimension k) so that locking key ring 145 acts as a wedge against both spacer rings. The widths m of spacer rings 141 and 143 are smaller than k, the mean width p of locking key ring 145, which has no cut such as 137 and 139, is such that the total width [p+2m] provides a strong positive locking action on wall 147 against groove 188 wall, both near its bottom and upward against lips 184 and 186.

FIG. 10 illustrates the means used to automatically lock plate 22 to structure 175 when plate 22 comes near its maximum displacement with respect to structure 175. The means used to hold plate 22 in that locked position and to release it when required are also shown. The lateral rigidity of toroidal tube 102 insures that plate 22 and structure 175 remain axially centered at all times. As plate 22 moves toward structure 175, locking head assembly 101 enters cavity 192 through opening 194 in boss 182. Locking head 101 includes a plurality of fingers 103 loosely articulated around pins 105 mounted on and near the bottom of locking head 101, and guided by axles 107, also held by locking head 101, inside slots 109 cut into locking head 101. Fingers 103 are restrained by axles 107 which slide inside curved slots 229. A centrally located plunger 111 terminated by a cone 113, can lock fingers 103 in their outward position, when cylinder 111 is down, or let fingers 103 swing back inward when plunger 111 is retracted upward, at which time plate 22 is free to disengage from structure 175. The reaction of plate 22 on structure 175 is absorbed by tips 115 of fingers 103 nesting in recesses 117 and pushing against the recess walls. These recesses are cut at the bottom end of locking head 101 inside its body, so that pins 105 are not subjected to large loads. Plunger 111 is mounted on hollow stem 119 affixed to piston 121 sliding inside cylinder 123. Piston 121 is equipped with restricting orifice 125 and a hole 127 in which bar 129 can slide. Bar 129 has grooves longitudinally cut into it to provide passages for the steam, in addition to restricting orifice 25, in a manner programmed to be a function of piston 121 vertical position. Cylinder 123 is also equipped with a piston 133 which slides inside cylinder 135 attached directly to structure 175. Piston 133 contains a restricting orifice 32 and a check valve 34. Piston 133 also slides on a small concentric cylinder 36 attached to structure 175. Cylinder 36 contains an annular chamber 38 around central tube 40 and opened on the inside of cylinder 123. The steam for tube 40 is provided by manifold 42. The steam for cylinder 123 is provided by manifold 44. The actuation of plunger 111 is automatically monitored by plate 22 position detector 46 affixed to rod 48 mounted on piston 50 which slides inside cylinder 52. This piston/cylinder assembly acts as control valve for the actuation of piston 121. The upper side of piston 50 feels the pressure of the steam supplied through manifold 54. Piston 50 contains a restricting orifice 56. The steam for cylinder 52 is supplied by line 58 and line 60 connects cylinder 52 outlet to inlet manifold 44. Pistons 133 and 121, cylinders 123 and 135 are all equipped with sliding metallic seals such as 3 and that are depicted in FIGS. 13 to 15 in detail.

A typical cross-section of seal 3 is shown in FIG. 13. It comprises a core 5 to which flexible metallic leaves 7 are affixed, a backup ring 9 which seats in the bottom of groove 11 cut on piston 121 sliding surface. Leaves 7 have a springlike action and push against the inside surface of cylinder 123 to permit the seal to fit inside groove 11, thereby providing sealing. When viewed from the top, in the direction of arrow f, the seal edge looks schematically like the illustration of FIG. 14 in which the seal edge is shown developed as a straight line. Individual leaves 13 and 15 of each seal layer overlap, however, adjacent leaves are separated by narrow gaps such as 17 and 19 to maximize the amount of such overlapping, thereby minimizing steam leakage. A sideway view of seal 3 is shown in FIG. 15.

The details of tubes 45 used to inject the working fluid in cavity 2 are described in FIGS. 17 to 20. FIG. 16 indicates how tubes 45 are located with respect to shock absorbers 20, adjacent plates 22 and cavity wall 12. Because the axis of any shock absorber unit makes a small angle with the axis of any contiguous unit, because of the slight curvature of cavity 2 wall, plates 22 separate as they move toward wall 12, after the nuclear device detonation, as shown by arrows f. As is explained later, they come back slowly and according to a prescheduled sequence so that two adjacent plates cannot possibly ever interfere with each other. The plate return velocity is controlled so that it cannot possibly ever overshoot its rest position. Injection tubes 45, when plates 22 are at rest, just out beyond plate 22 lower surface as shown in FIGS. 16, 19 and 20. Each injection tube 45 is fed by two lines 21 and 23, connected to working fluid feed lines 57 and 59 of FIG. 1. If saturated steam is used as working fluid, only one feed line is required. The second feed line supplies the coal powder slurry if both steam and coal are used as working fluid. In this instance, coal slurry and steam are mixed in chamber 63, to exit at the end of tube 45, below plates 22, in the form of a high velocity jet of finely divided coal powder and water droplets carried by the steam, in a mist. A plurality of injection tubes 45 is used. They are located mostly around the upper hemisphere of cavity 2 wall. The distribution pattern of these tubes 45 around cavity 2 wall 12 is such that, at detonation time, the saturated steam/coal-powder mixture is as homogeneous as possible throughout the cavity.

Referring to FIGS. 17 to 19, the working fluid injection and mixing means comprise a swirl chamber 25 connected to feed tube 23 and located inside mixing chamber 63 that is terminated by a Venturi 29. Injection tube 45 carries the mixed working fluid to exhaust 65. The bore of tube 45 has especially shaped circular grooves 67. The groove shape is intended to help diffract the shock wave front, after the explosion when that shock wave front has entered the tube. The special shape of grooves 67 is also such that they do not interfere appreciably with the working fluid flow, while creating a useful disturbance in the boundary layer region of that flow. This boundary layer disturbance facilitates the mixing of the working fluid jet with the surrounding fluid after the jet has left tube 45.

The steam flows at a high velocity around swirl chamber 25 and meets the swirling spray of coal slurry slightly ahead and within the throat of the Venturi. Feed tube 23 is terminated by a small nozzle located in a manner such that the slurry exits tangentially to the inside cylindrical wall of swirl chamber 25. This wall has helically cut grooves on its surface so that the coal slurry flow has a high vortex momentum before it exits at or just past the opening located at the end of swirl chamber 25. The shearing action that takes place between the steam flow and the slurry flow, as they strike each other at an optimum angle, insures proper mixing of steam and slurry later as the mixture continues its travel down the injection tube. Grooves 67 can also be helically cut to add some swirling momentum to the mixture jet boundary layer.

The nuclear device is introduced in cavity 2 through the delivery tube assembly illustrated in FIGS. 21 and 22, which includes tube 6 equipped with a plurality of actuators 201 located inside tube 6 and attached to tube 6 wall by brackets 203 and connected to conical head segments 205, articulated on holding bars 207 which are affixed to the edge of flange 209. That flange flares out at the bottom of delivery tube 6. The end of tube 6 is positioned below plates 22. Only one delivery tube 6 is needed. It is located at the junction of six contiguous shock plates which have their common corners circularly cut to accommodate the tube outer diameter, in the manner already described for injection tubes 45, as shown in FIG. 2. Above flange 209 and below the travel end of plates 22, curved appendices 210 attached to the side of tube 6 retain stops 211 that are part of segments 205. The gaps 213 cut into the head of segments 205 are wide enough to let bars 207 slide through to the bottom of gaps 213 when segments 205 have opened beyond their vertical position, in the opening direction (arrow f). However, when stems 215 of actuators 201 are connected to brackets 217 attached by articulations 218 to segments 205, segments 205 are prevented from swinging past their open position 219. Position 219 of segments 205 provides an opening of diameter D much larger than the diameter d of the clearance space (shown by phantom lines 222 and 224) needed for the nuclear device (N.D.). Actuators 201 and their attachments are located well outside of this clearance space. In their closed position, segments 205 leave a small hole 220 open so that the linyard holding the nuclear device and its electrical lines are not interfered with and cannot prevent solid contact between adjacent segments 205. Bars 207 form the sides of a dodecagon and are welded together, end to end, to constitute a continuous structure. Undercuts such as 221 and 223 in flange 209 and on the sides of segments 205 around gaps 213 insure that no interference is ever created and which could hamper the free swinging motion of segments 205. As is discussed and explained later, it may be advantageous to inject the coal slurry in the steam, after the detonation of the nuclear device, outside of cavity 2. This is done by tapping steam out of duct 39 and bringing it to a water reduction reactor 250, as shown in FIG. 1, which comprises a reaction chamber 251, a coal slurry injector 252, a heating jacket 253 equipped with heating elements 254 that receive their energy through electrical conduit 255. The coal slurry is brought by pipe 256 to injector 252 in which the steam and coal slurry are mixed as shown in FIG. 17. The steam needed to heat and vaporize the coal slurry is brought in by steam pipe 257. The vaporized slurry emerges inside reaction chamber 251 where it is further turbulently mixed with superheated steam flowing outside of reaction chamber wall 258, in which a plurality of holes such as 259 are cut, as illustrated in FIG. 24. The wall 260 of reactor 250, which also acts as a pressure vessel, is thermally insulated by a layer 261 of heat resistant material with low thermal conductivity. The mixture of superheated steam, hydrogen and carbon monoxide gases exits through duct 262 to be channelled to power plant housing 37 where the gas mixture is processed.

DISCUSSION AND OPERATION OF THE INVENTION

For almost half a century now energy has been produced by splitting atoms of fissile elements (fission) such as uranium, thorium and plutonium in a chain reaction process. More recently, the possibility of being able to fuse light elements to generate harnessable energy has come closer to reality. It is hoped that, in the not too distant future, elements such as deuterium and tritium (and mixtures thereof) can be fused together in a controllable fashion so that energy can be extracted directly in a usable form: heat and electricity. The fission reaction process is currently used widely in nuclear reactors of various types and sizes. For many reasons, still highly controversial, this type of nuclear reactors does not seem to constitute a viable long term answer to the ever increasing need for an inexpensive and nonpolluting fuel to replace fossil fuels that are becoming depleted or are considered too polluting. However, the fuel needed to generate energy by means of a fusion process is very inexpensive and is present in water, on a global scale, in such amount that, based on the present needs for energy, again on a global scale, its source is inexhaustible. But the technological problems created by the unavoidable need for extremely high temperatures required to trigger a fusion reaction have to this time limited its feasibility to that of very expensive laboratory experiments. Experts in the field of fusion exploitation anticipate that between 25 to possibly 50 years of further efforts will be required before the fusion process is available to generate energy industrially on a financially viable scale. This source of energy will then not be available before the beginning of the third millennium, if at all.

However, on a scale never imagined by man until some forty years ago, the fusion process has been used to generate energy in a fraction of a millisecond and so spatially concentrated that its direct use as a power source is completely impractical. Attempts have been made to capture this energy release and to store it in a manner such that this stored energy can later be tapped at a rate and under conditions that can be handled by present technology. Concepts have been proposed, studied and tried to do just that. A nuclear device is exploded underground in a rock formation or a salt bed. Assuming that the explosion does not vent to the atmosphere and that all the nuclear reaction byproducts remain trapped underground, the energy released by that nuclear reaction is also trapped in the rocks which become very hot. Water is injected in the cavity so formed. Heat is transferred from the hot rock to the water and steam is generated. It can then be extracted to bring the energy above ground where it can be used. It all sounds very simple and straightforward. In practice, it is not. This approach has been abandoned. Its three main drawbacks are: (1) the site can be used only once, (2) there is the ever present danger that either venting to the atmosphere or polluting underground water can occur, and (3) the control of the rate of heat extraction and of the heat nature may sometimes to either unfeasible or impractical, thereby rendering this source of power commercially unacceptable.

The present invention is predicated on the use of a similar "hole-in-the-ground" approach, but combined with the use of a plurality of means such that the three main drawbacks mentioned above are totally eliminated, in addition to many other minor drawbacks such as: (1) particulate matter being present in the extracted steam, (2) chemicals being present in the steam, such as salt or sulphur, (3) possible dangerous leaks of steam or water occurring at a later time, and (4) limited lifetime of each power source site. The discussion of the operation of the means provided by the present invention shows how all these drawbacks can successfully be eliminated. The energy source is a plurality of nuclear devices, detonated sequentially, one at a time, during the lifetime of the power plant, at prescheduled time intervals. The temperatures needed to trigger a fusion reaction is of the order of several millions of degrees centigrade and cannot yet be locally generated and maintained by means other than a fission reaction. However, some time in the near future, other sources of pulsed energy powerful enough will be available for such an application: high energy lasers. For the purpose of this discussion, it is assumed that the fusion reaction is triggerred by a small fission reaction, with the understanding that such triggerring will eventually be accomplished without the assistance of a fission reaction. The nuclear device detonation is referred to as a fission/fusion reaction. The nature and design of the nuclear device are not part of this invention and therefore irrelevant, except for the yield of the device. As will become later obvious when yield levels of interest are mentioned, and feasibility of such devices is state-of-the-art. To minimize the temperatures needed to trigger a deuterium fusion reaction, tritium must be added to the deuterium. The ratio of tritium to deuterium is optimized to minimize the ratio of fissile material to fusion fuel, for any total yield of the device, so that the maximum percentage of the total energy released by the explosion is contributed by the fusion reaction. For all devices, the energy is released in the form of radiation and localized heat that results in a fireball, which is always kept appreciably smaller than the size of cavity 2, by adjusting the device yield according to the size of the cavity. This is to prevent any possible contact, at any and all times, of mechanical parts with the fireball. The fireball heat dissipates rapidly by radiating energy beyond the fireball. The very high pressures created in the ambient medium generate a shock wave front that starts moving outward. It propagates until it reaches the shock plates. The device yield and the surrounding medium properties are matched so that the static shock front peak pressure does not exceed in the order of 20,000 psi for instance. Under those conditions, only a small percentage of the radiations released by the nuclear reaction reach plates 22. The surrounding medium properties referred to above are: (1) the chemical composition of the medium, (2) the pressure and temperature of the medium, and (3) the percentage of water in liquid form present in the medium. These are such that, after the explosion, when steady state conditions have been reached inside cavity 2, the pressure and the temperature of the "heated" medium are those which are needed by the power plant to operate most efficiently. However, they are both below those values that are considered safe enough to insure that the structural integrity of the mechanical parts and components is never jeopardized, even at the end of the lifetime of the power plant.

As mentioned earlier, two basic ways to extract usable energy are available and considered in the present invention. Any degree of combinations of these two basic ways can also be used. These two ways are: (1) Heating a high moisture content saturated steam to a superheated steam state which can then be utilized as heat source or to drive turbogenerators; and (2) Heating a mixture of saturated steam and of finely divided coal powder (carbon) suspended in the steam, to produce hydrogen ($H_2$), carbon monoxide (CO) and excess superheated steam. In (2) above, $H_2$ and CO can be separated from the superheated steam. The steam can be used as in (1) above, $H_2$ and CO can be used as other new sources of fuel as is deemed best, either on the site or in regions where gaseous fuels are in demand. The basic operation of the present invention and of the nuclear devices is the same in both cases, except for a very important aspect: the temperatures reached by the working fluid after the explosion must be appreciably higher in the second type of operation, so that the basic overall chemical reaction $H_2O + C \rightarrow H_2 + CO$ can take place and yield a high enough degree of water reduction by the carbon. As an example, in the first type of operation, temperatures of the superheated steam could peak at 1000° to 1050° F. (550° C.), whereas the temperatures of the superheated steam must be at least 1650° F. (900° C.) in the second type of operation. Such a difference in temperatures (350° C.) means that the nature and class of metals used in the fabrication of parts and components cannot be the same in both cases, unless cooling means of the parts exposed to such temperatures are used in the second case. Otherwise, there are no other basic dissimilarities between both modes of operation for the production of the working fluid by means of the energy released by the fission/fusion reaction.

As an example and to keep the discussion simple, the following cavity dimensions and characteristics, and working fluid parameter values are used to determine the type and minimum size of the nuclear device, in the simpler case of the first type of operation (generation of superheated steam only):

Minimum diameter of the cavity: 500 ft

Maximum peak pressure sustainable by the cavity wall: 3000 psi

Maximum temperature of the superheated steam: 1050° F.

Initial conditions (before detonation) of the saturated steam:

Atmospheric pressure (15 psi) and 212° F. temperature with a 75% moisture content by weight, Cavity volume: $6.545 \times 10^7$ cubic feet (ft$^3$)

Weight of the saturated steam inside the cavity: $9 \times 10^6$ lbs

Under these initial conditions, the working fluid parameters of interest, immediately after the explosion, are as follows for two typical device yield values of 1 and 5 kilotons (kT):

| PARAMETERS | YIELDS: 1 kT | 5 kT |
|---|---|---|
| Energy generated by the explosion (BTU): | $4 \times 10^9$ | $2 \times 10^{10}$ |
| Enthalpy increase by pound of steam (BTU): | 400 | 2000 |
| Enthalpy increase required per pound of steam to bring it to the final state specified above: | 1,300 BTU approx. | |

From the data presented above, it appears that a 3 kT device is adequate. The peak static pressure felt by plates 22 is appreciably lower than the 20,000 psi level mentioned earlier as being acceptable. The moisture content specified above for the saturated steam may be difficult to maintain for long enough periods of time. Another set of initial conditions, more ralistic in terms of moisture content (40 to 50%), can be used as another basis for a typical type of operation: (1) Initial steam pressure: 60 psi; (2) Initial steam temperature: 293° F. This results in a nuclear device having a yield of 7 to 8 kT. The peak static pressure felt by the shock plates is still less than 10,000 psi in such a case. However, if the nuclear device yield is further increased, another factor comes into play: the momentum imparted to plates 22. The shock plate kinetic energy, which results from that momentum, then requires prohibitive shock absorbing capabilities that the shock absorber system cannot realistically provide. Assuming a realistic value of 15,000 psi for the peak of the reflected pressure ($P_f$) of the shock wave front, which then acts on the shock plates, in the case of a 7.5 kT yield and of an initial steam pressure of 60 psi (all pressure are absolute pressures), the duration $\Delta t$ of the positive phase of the shock wave is just less than 1 millisecond (msec) at a distance of 250 ft (cavity radius). The total impulse delivered to the shock plates per square inch (in$^2$) of exposed surface corresponds to the area below the curve of FIG. 23 and is: $I = \int_0^t P_{(t)} \cdot dt$. It is roughly $P_P \Delta t/3$ or 5 lb.sec/in$^2$. An exact calculation of such impulse at sea level and in air yields a total impulse of 4.3 lb.sec/in$^2$, which is given as a reference point. For steel plates, about 3.4-inch thick, the areal density of plates 22 is approximately 1 lb/in$^2$. An impulse of 5 lb.sec/in$^2$ then imparts a velocity of about 150 ft/sec to the plates. The exposed area of each plate 22 is about 180 ft$^2$, if 1000 plates are used, and each hexagon side is slightly less than 8 ft. The weight of each plate is roughly 22,000 lbs and the kinetic energy of each plate (MV$^2$/2) is about $7.5 \times 10^6$ lb.ft. Assuming that a differential pressure of 2000 psi is applied on an effective area of the shock absorbers 20 of 1000 in$^2$, the total travel of the plates is then about 4 ft. This requires a total distance between the plates (at rest) and cavity 2 wall inner surface of appreciably less than 20 ft (less than 7% of cavity 2 radius). Although the numbers above are no more accurate than ±15% with respect to the exact numbers that could be obtained with lengthy calculations, they show that the features herein described of the present invention, as shown in FIGS. 1 to 16, are very realistic. A factor, which can only be beneficial, has been ignored in the simplistic calculations above, it is the attenuation effect that the moisture has on the shock wave propagation, from the fireball outward. As the shock wave travels through the saturated steam, some energy is dissipated inside the shock wave front by the vaporization of the water, as the steam is instantaneously heated up. This results in a decrease of the peak shock front pressure by some amount which is impossible to calculate simply. It is certainly not negligible as one can easily guess from the well known attenuation effect that heavy fog has on sound waves. From the discussion above, it appears that a 500-ft diameter cavity could easily handle nuclear device yields of up to 10 kT. For such devices, the ratio of fission to fusion could be as low as 10%. Efficient fission devices with a yield of less than 1 kT have been built and tested. Therefore, it seems that the pulsed nuclear power plant described in the present invention could operate satisfactorily with nuclear fuel in which 90% of the energy is provided by the fusion of a deuterium/tritium mixture.

To make the power plant operational full time, two cavities 2 are required. One cavity produces the superheated steam, while the other is being filled with saturated steam and readied for the next detonation. The use of two such cavities and of 10-kT devices generates $2 \times 10^{13}$ calories between two consecutive detonations in either cavity. This corresponds to $24 \times 10^6$ kWh for the same period of time. Assuming an overall efficiency of 20% (heat to kWh on line), such a plant has the power production of a 1000-MW conventional nuclear reactor if one device is detonated every other day in each cavity. For a 30-year lifetime, this corresponds to less than 11,000 nuclear devices for a total of 110 MT (four maximum size ICBM H-Bombs!). If a large portion of the energy so produced is in the form of hydrogen and carbon monoxide gases, should this type of operation prove to be more advantageous economically, because of the temperature problems alluded to earlier, it might be preferable economically to operate the power plant in a slightly different manner. Both cavities still generate steam at possibly 3000 psi and 1200° F., for instance. Some steam at high pressure is used to generate electrical power. Some steam at lower pressure is used to react with the coal slurry which is injected inside a water reduction reactor, which is heated by some or all of the electrical power produced by the high pressure steam. The steam/coal-powder mixture temperature can then be easily brought up to 1050°–1100° C., which maximizes the chemical reaction yield. This process can be continuous. This means that only a small amount of structural expensive materials is then needed, because the volume of the water reduction reactor is a very small fraction of that of cavity 2 volume. The concurrent use of a steam generator and of a water reduction reactor permits to optimize the cost of the structures of both systems, thereby the cost of kWh produced. Therefore, the operation of the present invention is discussed hereafter as though superheated steam only were produced by cavity 2, for the sake of simplicity.

A short while before the scheduled detonation time, the nuclear device is introduced through delivery tube 6. Segments 205 are fully open. When the device has reached the center of cavity 2, segments 205 are closed and only the linyard holding nuclear device 4 in place is present inside cavity 2, except for device 4. Everything is still and nothing is further injected in or extracted from cavity 2. The pressure, temperature and moisture content of the ambient saturated steam are assumed to have the programmed values. The device is then detonated and its energy is released. Most of the radiations emitted by the explosion are absorbed by the surrounding steam. This results in the creation of the fireball. This radiation absorption takes place within a distance from cavity 2 center which is only a fraction of cavity 2 radius. Some "doping" of the water with radiation shielding materials can be used to control the diameter of the fireball, so that: (1) the local heating of the shock plate inner surface is minimized, and (2) the amount of direct radiations received by the plates is kept below a critical level. The ensuing shock wave generated, as earlier described, races toward these shock plates and first reaches the conical head formed by segments 205. The injection tube 65 openings are reached later and then, finally, shock plates 22 receive the full impact of the shock wave front. An instantaneous velocity increment is given to the plates which then start moving outward. Some of the shock wave front is not stopped and slips by the openings located at the apexes of the plate hexagons. Each one of these four basic types of shock wave interaction with mechanical parts is discussed separately below, because each one is different and is handled differently by the components involved.

Referring to FIG. 21, one can see that a cone angle of about 90° is formed by segments 205, when closed. This angle could easily be made smaller and segments 205 outer surface can be specially shaped as phantom line 248 depicts, so that the shock wave can be more easily deflected and impart a lower momentum to the conical head assembly. The minimal impulse imparted to segments 205 results in a short lived external pressure on cone 30 and which can easily be withstood by segments 205 which, in contact with each other, constitute a very strong shell. However, the vertical component of the impulse is transmitted to tube 6 through rods 207 and finally flange 209. This is the weak link between cone 30 and tube 6. It can be strengthened by short flanges 247 on the top of brackets 217 so that, when segments 205 are in the closed position, flanges 247 fit and rest on the underside of flange 209, so that the danger of any flattening and flaring out of flange 209 is eliminated. The delivery tube is quite long and very massive. The kinetic energy, if it is not solidly attached to shell 14, that this tube can acquire is not large and can easily be absorbed by a shock absorbing system inserted between its lower and upper parts. The delivery tube can then consist of two telescoping halves, with the telescoping section being located above the upper attachment points of actuators 215. The articulations of segments 205 on rods 207 are very loose and are designed in a such a way that the possibility of seizing or galling is totally avoided as the drawings of FIG. 21 demonstrate.

FIGS. 17 and 19 can best be used to explain the interaction of the shock wave with the end of the injection tubes. The end of the tube wall is chamfered on the outside corner to deflect the shock wave front outward. Also, the front part of the shock wave has a length much larger than tube 45 wall thickness. For all these reasons, the impulse delivered to that wall is negligible. Because of its large weight (very long tube), if it were free to move lengthwise, the tube would acquire a negligible amount of kinetic energy. It can safely be attached solidly to shell 14. A circular section of the shock wave enters tube 45 through opening 65. The length of that section is many times the inside diameter of tube 45. The various obstacles encountered by the shock wave inside tube 45 and which are designed to slow it down and spread its front insure that, within several feet, the shock wave is transformed into a pressure wave of not much importance.

Referring now to FIG. 3, assuming that the right edge 24 of plate 22 is one of the sides of triangles 249 of FIG. 2, the front of the shock wave passing through such a triangular opening between three adjacent plates 22 travels past edges 24 of these plates to form a "jet". The boundary layer of this jet is forced to bend toward the shock absorber and intermediate structure 18, by an angle $\gamma$, the way a gas jet expands out of a nozzle. The dimensions of plate 22 and of intermediate structure 18 are such that the edge of the expanding shock wave "jet" does not touch structure 18 edge. By the time the weakening shock wave "jet" reaches piston stem 110, neither the pressure nor the impulse felt by piston stem 110 are of any consequence. For all practical purposes, during the time taken by all these shock wave interactions, plates 22 have not yet moved. All triangles 249 play the role of discharge nozzles. The flow of steam past plates 22 insures that steam pressure builds up behind the plates. The total area of these triangles is about 10% of the total plate area. This means that only 90% of the shock wave that hits the plates is reflected back inward. This percentage of reflected shock wave can even be made smaller by increasing the size of triangles 249. The reflected part of the shock wave implodes when its reaches the center of cavity 2. It then acts as a point source for another much weaker shock wave that again races outward to hit the shock plates a second time. This explains why triangles 249 must be made as large as possible. Also, this results in higher "back" pressures behind plates 22, which contributes to their slowing down. By the time the second interaction of the shock wave with the plates takes place, all of the moisture has vaporized. A large fraction of the energy contained in the shock wave has dissipated by then. For the following discussion, it is assumed that this second shock wave interaction does not impart a meaningful additional impulse to the shock plates.

The first shock wave interaction with plates 22, which is of most importance, would take place with the shell 14 of cavity 2 wall if these plates were not there. One explosion would then be enough to render cavity 2 unusable. Plates 22 have only one function: isolate the cavity wall from the dynamic loading that the shock wave imposes on any obstacles on its path. Plates 22, by means of their shock absorbers, transform a short time dynamic loading into a much longer time static load of much lower magnitude, by a factor of 30 to 100. As earlier explained, after the first shock wave interaction, plates 22 pick up a velocity of 150 ft/sec in 1 msec or less. This represents an average acceleration of 5,000 times the gravity acceleration (g), with a peak, possibly, 3 times higher. During that 1 msec, the plates move less than 1 inch, but have acquired a velocity of 100 mph. Under such loading conditions, no rigid structure of any consequence can be directly attached to the plates. Something similar to tires is needed. But the use of any non-metallic materials is precluded because of the hot and radioactive environment. Only light, flexible and deformable metallic parts can be connected to the shock plates. However, to stop the plates within a few feet, a substantial heavy shock absorbing structure is needed behind each plate. The shock plates must also be guided laterally during their travel outward and be returned in place to be ready for the next cycle. The solution is an approach akin to airplane landing gears. This is achieved with the use of a short stroke (about 7 to 10 inches) very light and flexible first stage shock absorbing system, solidly affixed to the back side of plate 22 and to the rigid and heavy second stage shock absorbing system that provides the major part of plate travel and kinetic energy absorption. The stroke of the second stage is several times longer than that of the first stage. The loads exerted by one stage on the other are transmitted by the light but rigid intermediate structure 18. The peak of these loads, thanks to the shock absorption provided by the first stage, never exceeds 500 g's (approximately 4% of the peak acceleration experienced by plate 22).

The operation of the first stage shock absorber is discussed first. The outward displacement of plate 22 first flattens the bottom surface of toroidal tube 102. Referring to FIG. 5 for illustration, one sees how wall 147 wraps itself around boss 180 on plate 22, when plate 22 has moved a distance H. The contact area between plate 22 and wall 147 is $2\pi 1D$. The force exerted by wall 147 on plate 22 is $2\pi 1DP$, if P is the pressure inside the deformed torus at that time, above ambient pressure. This is one component of the decelerating forces applied on the plate. Referring now to FIG. 3, another torus 102' can be located inside the larger torus 102 and play a similar role. Also, steam at a pressure lower than that inside the torus, but at a much higher pressure than ambient pressure behind the plates, can be introduced in the internal volume enclosed by plate 22, the inner wall of torus 102 and plate 177 of intermediate structure 18. The steam pressure inside that volume 235 is monitored and controlled by quick action valve 230 which connects volume 235 with the outside through ducts 231 and 232. Control valve 156 is used, prior to the explosion, to adjust and maintain this pressure through pipe 233. The radii R of the curvatures of boss 180 are the same as radius R of torus 102 cross-section. Because the velocity increase of plate 22 is sudden, as it moves outward at a velocity of 150 ft/sec, if plate 22 back surface were flat at the point of attachment of torus 102, he bottom part of wall 147 would not have enough time to move sideways to maintain tension on bands 165 and 167 of wall 147, at the point of contact C. Point C would then be located at point F instead of at point G where it would have been, had the motion of plate 22 been much slower. Also, at all times, the pressure inside torus 102 is high enough to keep bands 165 and 167 under enough tension so that these bands (or wall 147) never have to bend locally and make a sharp angle. They always form a blending curvature of radius r between the wall part in contact with plate 22 and the torus cross-section circle of radius R. Eventually, this curvature of radius r (ripple) moves up along wall 147 to get ahead of plate 22, when the tangent T to the torus wall at point $\tau$ becomes steep enough for the vertical component of the ripple velocity along wall 147 to become higher than plate 22 velocity. This condition occurs before wall 147 ever reaches points X on plate 22, which indicate where the flat part of the back surface of plate 22 begins. When the relative velocity between both plates 22 and 177 is nil (position of maximum compression of torus 102), torus 102 cross-section is then flattened out on both of its "faces". The unflattened side walls of the torus bulge out and assume the positions shown by phantom lines 234 and 236. In that position, bands 165 and 167 of FIG. 7 have slid with respect to each other to reduce gap 169 for the inner side of wall 147, and to increase that gap for the outer side of wall 147. This relative lateral sliding motion between bands 165 and 167 provides the degree of compliance required for the adjustments of the torus inner and outer diameters to take place. In any event, the torus mean diameter D always remains the same. At this juncture, both plates 22 and 177 move outwardly at the same velocity. At this point of their travels, they have become locked by means of locking head 101, so that plate 22 and intermediate structure 18 are not pushed back away from each other, which would cause a relative axial oscillatory motion of structure 18, piston stem 110 and piston head 108 within the space between plate 22 and upper structure 106 of the shock absorber second stage. As justified later, such oscillatory motion, would be detrimental to a satisfactory operation of the shock absorbing system. As plates 22 keep moving outward, the gaps between the adjacent sides of two contiguous plates 22 become larger, which allows the pressures inside cavity 2, on both sides of the shock plates to equalize.

The locking of plates 22 to their respective intermediate structures 18 must be automatic, foolproof and failsafe. Referring to FIGS. 10, 11 and 12, the locking system operation can best be described by following the motions of the various parts involved, as boss 182 comes up toward locking head 101, before it becomes fully engaged as shown in FIG. 10. Plunger 111 is then in the "up" position, fingers 103 are hanging down loosely in the extended position, piston 133 is down, sensor 46 is down, boss 182 and cavity 192 are coming up. When lip 190 of cavity 192 reaches fingers 103, these retract inward, pushed in by lip 190 so that the whole of locking head 101 can pass through opening 194. The bottom of locking head 101 reaches the bottom of cavity 192 and the whole assembly of locking head 101 and piston 133 is pushed upward. Plate 22 is moving quite slowly with respect to intermediate structure 18 when this happens. Boss 182 contacts sensor 46 and pushes piston 50 upward. Steam is admitted in tube 60, as piston 50 land uncovers tube 58 opening, and steam pressure is applied on the upper face of piston 121 which then moves down to force the conical part 113 of plunger 111 between fingers 103, thereby forcing them to move apart and to lock onto the side walls of cavity 192, under lip 190.

Locking head 101 is then secured inside cavity 192 and plate 22 and structure 175 (part of intermediate structure 18) are now locked tightly together. At that time, the pressures inside torus 102 and in space 235 are caused to decrease rapidly by opening control valves 156' and 230. Piston 133 is still moving upward slowly and stops when plates 22 and 175 have reached the same velocity. The locked-in assembly is still moving fast with respect to cavity 2 wall 12. The only communications between the upper and lower sides of piston 133 are through restricting orifice 32 and check valve 34, then open. At that time, the residual differential pressures inside torus 102 and space 235 push plates 22 and 175 slowly apart, and piston 133 starts moving down with respect to plate 175. Check valve 34 then closes and the steam trapped under piston 133 can escape very slowly, only through restricting orifice 32. Slowly, piston 133 comes to rest on its lower side against structure 175. Plates 22 and 175 are then finally firmly locked, absolutely not moving with respect to each other. The whole solid assembly is moving outward with the same velocity, as a single mass. The kinetic energy of this mass remains to be absorbed by shock absorber 20 which has the task of first absorbing and then eventually dissipating most of plate 22 kinetic energy. The operation of shock absorber 20 now becomes of paramount importance.

Referring back to FIG. 3, in which piston stem 110 is now assumed to have moved outward several inches, the steam pressures in chambers 116 and 118 keep increasing and the pressures in chambers 132 and 134 keep decreasing. Valves 144 and 150 are both closed. The only communication between these chambers is by means of small restricting orifices 130. The differential pressures then acting on structure 175 and across piston head 108 create the decelerating force needed to stop plate 22/structure 18 locked assembly on its way outward. Eventually, piston head 108 reaches sensor 124 so that piston head 108 position and velocity can be monitored from then on. The steam pressure inside chamber 116 is also monitored by pressure sensor 237. During this outward motion, pressure is not applied inside bellows 178 and 179, and brake shoes 75 and 76 are not used. When piston head 108 is close to the end of its outward stroke, pressure is then applied inside bellows 178 and 179. Curved plates 98 and 99 are then pushed against stops 197 and 199. The motion of stem 110 prevents the brake shoes from engaging, but, as soon as piston stem 110 stops and initiates its return stroke, because springs 181 and 183 push the brake shoes downward and because of the slight slant given to stops 197 and 199, the brake shoes become engaged and start applying equal braking pressures on both sides of stem 110 wall. To hold piston head 108 still at the end of its stroke, control valve 120 opens just before piston head 108 completes its outward stroke, so that the pressure above piston head 108 decreases very rapidly. Control valve 150 also opens to dump steam out of chamber 118 quickly. Shock absorbers 20 are then held in that position, clamped until plates 22 are needed back in their rest position, at which time they are very slowly returned by shock absorbers 20.

Because plates 22 cover a spherical surface, their supporting shock absorber axes, although all oriented along a radius of that sphere, have all and any possible orientations with respect to the vertical reference line which is the axis of delivery tube 6. All the drawings of the various parts and components show them in a vertical or quasi vertical position for ease of illustration. But very few, except for delivery tube 6, are positioned that way. Therefore, they all must be able to operate in any attitude, sideways or upside down, because they must all be interchangeable. If one carefully reviews the individual operation of each of these parts and components as previously described and discussed, one can see that neither gravity nor orientation affects any of these operations. Only the brake shoes are pushed inward by springs (181 and 183). These springs exert forces many times larger than the weight of the brake shoes and gravity plays no role in the functioning of the brake shoes. A special mention must be made of plates 22. They are very massive (10 metric tons each) and are only held by the shock absorbers when they are not at rest, and somewhat supporting each other then. This requires some further elaboration.

It was earlier stated that, when at rest, all shock plates are in contact with one another and all of the hexagon sides shoulder the sides next to them. The total weight of the plates of 10,000 metric tons is distributed between 1,000 shock absorber assemblies. Some assemblies are pushed, some are pulled, but most are sujected to bending moments. These moments are transmitted to wall 12 of cavity 2 by means of cylinders 106. As is well illustrated in FIG. 3, these are anchored to wall 12 by means of large bolts that firmly hold flange 114 against steel shell 14. A plurality of reinforcing ribs 239 connect flange 114 to the outer surface of cylinder 106 over half of its length in order to give this assembly maximum flexural rigidity. Also, in its extended position, piston 104 assembly is held by piston head 108 and cylinder 106 bottom end 112 which guides and laterally restrains piston 104 stem 110. The distance between piston head 108 and cylinder 106 bottom end 112, at rest, is equal to the full travel of intermediate structure 18. This is intended to give piston stem 110 and intermediate structure 18 almost no lateral movement, even when they are in their fully extended position. The worst case of such loading occurs for the shock absorbers that have their axes in an horizontal or quasi horizontal position. The clearances between piston head 108 and the inner diameter of cylinder 106, and between the outer diameter of piston stem 110 and the inner diameter of bottom end of cylinder 106 are kept at a minimum. The lateral deflection of intermediate structure 18 caused by 10 tons being applied to the end of piston stem 110 is kept down to a small fraction of an inch by making the thickness of stem 110 wall large enough to that effect. The most questionable ability of any component to support side loads with a minimum of deflection is that of toroidal structure 102.

At this point, it should be emphasized that plates 22 need very good lateral positioning only when they risk to interfere with one another during their return stroke, as the plates are being returned to be positioned for the next explosion. First, to help plates 22 position themselves, all contiguous sides of the hexagons are chamfered as depicted in FIGS. 19 and 20 by an angle $\alpha$ and which starts at about one third of the thickness of plate 22, starting from the front surface. The plates are $3\frac{1}{2}$ inch thick. Angle $\alpha$ is about 30°. Therefore, the width of these chamfers, on the back surface of plates 22, is about one inch. At worst, when plates 22 are within three feet of their rest positions, after one fourth of their total return stroke, they all have plenty of time and opportunities to "nudge" one another in place. At that time, as is discussed below, the torii have assumed their fully extended positions and are fully pressurized. Their annular diameter d shown in FIG. 5 is made as small as possible, so that, when fully pressurized and extended and when subjected to a side load of 10 tons, they laterally deform less than one inch. To reinforce the shearing strength of torus 102, when subjected to this type of side loading, a wire mesh can be installed outside of bands 165 and 167. Such a wire mesh can be designed also to share the hoop tensional loads created by the pressure inside torus 102. The return of plates 22 is discussed below and also serve to complement the above discussion.

Referring back to FIGS. 10 and 12, both pistons 133 and 121 are now down and at rest. Plunger 111 is still holding fingers 103 in their extended position. Piston 50 is also down. The steam pressures in space 235 and inside torus 102 are high enough to provide the lateral rigidity required to maintain plate 22 in their clamped position without exerting excessive side loads on the locking head and piston 101. This is especially so for those plates 22 that are in a vertical or quasi vertical positions, as was explained earlier. At the same time, these pressures are kept to a level no higher than justified for the reason given above, so that the force needed to unlock locking head 101 is manageable. As soon as the brake shoes have clamped piston stem 110 solidly in place, the release process of the shock plates is initiated. Steam pressure in space 235 is equalized with the ambient pressure, which has by then stabilized. The steam pressure inside torus 102 has the value just mentioned earlier. At this time, steam pressure is applied through tube 40 and holes 125 under piston 121, and piston 121 starts moving up. "Up" and "down" refer to the position given to the assembly shown in FIG. 10, but do not apply to all such asssemblies for reasons discussed previously, although all assemblies operate in a similar fashion. Plunger 111 retracts and fingers 103, pushed inward by lip 190, disengage themselves. Pushed by the compressed torus, plate 22 starts moving away from plate 175. However, by doing so, plate 22 increases the volume of space 235 and the pressure inside this volume decreases below the ambient pressure. A proper balance between the two pressures of interest to this discussion: (1) pressure inside torus 102, and (2) pressure in space 235, can be reached and controlled to achieve two goals. First, to insure an adequate lateral support of all plates 22, and second, to control the rate of return of the plates so that they move very slowly inward and reach their rest position with a velocity almost nil. This maneuver insures that: plates 22 have ample time to "nudge" one another in place; their sides do not hit each other, they all reach their final positions at about the same time and that no axial oscillation of the plates is induced, which could have adverse consequences. It should be mentioned that the shock absorbers 20 are still in their retracted clamped position, when this takes place, and that this condition should not disturbed, yet.

When deemed appropriate, as scheduled, the return of the shock plates to their final rest and firing positions is initiated. At that time, plates 22 are held by intermediate structures 18 and torii 102, with no other mechanical means being used. The final stage of the plates return must be slow and smooth. To that effect, the steam pressure inside bellows 178 and 179 is slowly reduced. Control valve 144 is monitored so that piston head 108 and plate 22 begin to move slowly, in unison. All plates 22 need not be returned together. As earlier explained, the return of the shock plates located at or near the top and the bottom of cavity 2 is much easier to achieve. These are scheduled to be returned first. Thus, shock plates are returned sequentially from the upper part of the bottom hemisphere of cavity 2 on to the "equator" of cavity 2, and then upward until the last plates finally meet those shock plates located at the top of cavity 2 and that are already in place. Eventually all plates 22 are in their rest position, ready for the next explosion. Triangular openings 249 are more than adequate to provide passage for the steam being extracted from the inside of cavity 2.

When the shock wave hits plate 22, immediately after the explosion, the shock wave is reflected. During this short interaction between the shock plate and the shock wave, very high pressures are exerted on the front surface of plate 22, in the range of 100,000 psi for the operation conditions earlier discussed. A compression stress wave is created inside plate 22. This compression wave travels through the plate thickness at the speed of sound in the metal used in the fabrication of the plates. When this compression wave reaches the backside of plate 22, this compression wave is reflected as a tension wave. When such tension wave causes tension stresses in the metal in excess of the ultimate strength of the metal, rupture of the metal occurs. This phenomenon is called spallation. However, when the compression wave is longer than the thickness of the plate, the reflected front of the tension wave combines with the tail end of the still arriving compression wave. The net result is tension stresses that are lower than the peak tension stress that would have developed, had the plate been much thicker. In the present application, the length of the compression wave is quite larger than the thickness of plate 22. The net maximum levels of tension stresses developed here are much lower than the tensile strength of any metal alloy that can be considered for the application herein, even at operating temperatures of 1100° F. and after radiation exposures during the power plant lifetime. However, clamps, flanges or similar parts cannot be attached by screws or bolts, or even welded on plates 22. The reflection of the compression stress wave from the backside of these plates, much too complex to discuss here, delivers enough kinetic energy to any other metal part affixed solidly to the plate that, after a number of exposures, any type of attachment would become loose and eventually break. Only massive protuberances that are part of the plate itself and that are specially shaped, such as depicted by FIGS. 3 and 5 for bosses 180 and 182, remain unaffected by the reflection of the compression stress wave.

To obtain a continuous and steady production of steam at a pressure and a temperature of interest, as earlier mentioned, a power plant site must have two cavities operating in tandem, but alternatively. While superheated steam is being extracted from one cavity, water or a water/coal-slurry mixture is being injected in the other cavity. Extraction of superheated steam from a cavity is stopped and water injection in that cavity is initiated when the pressure in that cavity has dropped below a predetermined level below which steam cannot be used efficiently. At that time, both steam pressure and temperature in the cavity are such that the replacement of the extracted steam by an equal weight of water reinstates the initial conditions of the working fluid to what they were prior to the previous explosion.

Although cavities larger than cavity 2 described herein and used as an example can be used, the availability of sites for such huge "caverns" decreases rapidly with size and the cost of building them increases even more rapidly with size. In fact, the logical trend should be in the opposite direction: smaller cavities, lower yield devices and increased frequency of explosions. The extreme limit in that direction is that approach which is being pursued by the fusion experts and which appears many years away from fruition, with the basic difference that their attempt is founded on containment of the plasma created by the fusion energy. Containment means that the energy extraction means are physically separated from the fusion energy production means, while the energy transfer between the two takes place. There resides their problem. In the present invention, the fusion energy production means and the means to transfer energy to the energy extraction means are not separated, they are all in one common volume that needs no mechanical parts inside it. The mechanical parts are outside the volume to limit and constitute that volume. In addition, the energy extraction means (working fluid) play several beneficial and essential roles: (1) they isolate ideally the "plasma" from the mechanical parts, (2) they shield the mechanical parts from most of the radiations generated by the fusion energy production means, (3) they eventually eliminate and dispose of the plasma itself, and (4) they permit the use of present technology materials, construction techniques and transformation methods of the extraction-means energy into usable energy (electricity, heat or other clean non-polluting fuels). Discussing the miniaturization potential of cavity 2 is now worthwhile and is presented below.

The main drawback of a cavity size of 500 ft is that it requires parts that are used only once during each cycle with a lifetime of 10,000 cycles, whereas, mechanical parts have a useful lifetime of millions of cycles in most types of machinery. The cost of such underused parts cannot help be unjustified. As was earlier explained, the size selected for the purpose of the above discussion is only as an example. If it can be shown to be feasible, smaller sizes can only be more feasible. At this juncture, a basic distinction must be made between what is feasible with present day technology and what will soon become feasible when laser technology provides the means to trigger a practical size pure fusion reaction. The first case is discussed first.

If and as long as a fission reaction is the only way to trigger a large size fusion reaction, it seems that the smallest possible size for a power plant of the type so far discussed is as follows: one explosion every 5 hours, a cavity diameter of 235 ft, a total device yield of 1 kT and a fission/fusion ratio of more than 10%. This based on the assumption that an efficient reliable fission nuclear device of 0.1–0.2 kT can be produced with present day technology. This is realistic enough. To give an example of the impact of only a factor of 2 scaling down, for the same 1000 MW power plant, the weight of the shock plates is cut down from 10,000 metric tons to a few hundred metric tons. The cost of construction can be cut down by a factor of more than 20, while the lifetime of the mechanical parts is still only just over 100,000 cycles. It would seem that 200 ft for the diameter of cavity 2 for this first case is about the minimum practical size and most economical.

The second case is based on the assumption that a pure fusion reaction triggered by non-nuclear means could be feasible in a few years. A laser trigger can be assumed for the purpose of the discussion. In any event, the trigger itself is assumed to generate no meaningful amount of energy, as compared to the fission trigger. It would also leave no fission by-products to mix with the working fluid. In this case, theoritically, cavity 2 can be made quite small and more than two would probably be used for each power plant. The lower size limit is then dictated by engineering considerations of practicability and economics. It would seem, at first glance, that scaling down the original 500-ft diameter cavity by a factor of 10 (factor of 1000 for the volume), using 20 such cavities, exploding two devices with a yield of 0.01 kT each (equivalent to 10 tons of TNT) per hour per cavity would generate the same power level (1000 MW) but with a 100 times smaller total volume of metal, concrete, working fluid and maybe cost. However, this is the equivalent of a 10-ton bomb going off on the site every 1.5 minutes. These numbers are mentioned to keep things in perspective. The conditions of the saturated steam before the explosion and of the superheated steam after the explosion would be the same as was earlier discussed for the 500-ft diameter cavity. Further exercizing numbers would serve no purpose, but it is important to state that a 50-ft diameter cavity and all the mechanisms described previously and their operation would be exactly those which have been presented earlier.

After the first device detonation, especially when a fission nuclear trigger is used, the inside of cavity 2 becomes very radioactive. From then on, it unimaginable that any personnel could ever be admitted inside the cavity. But for repairs or inspections of some parts and components, visual and physical access must be made possible. The largest assembly that can fail and need replacement is the shock plate and shock absorber assembly. Means must be provided to perform such a task safely and effectively. To that effect, a work chamber 275 is located near the top of cavity 2 and is shown in phantom lines in FIG. 1. Access to cavity 2 from chamber 275 is provided by gate 273, and communication between work chamber 275 and operation room 31 and working space 33 is through access door 277. The shielding, remote control, communication and handling means aspects of such operation are well known and used daily in the operation of conventional nuclear reactors. They need no further discussion. However, the size and dimensions of work chamber 275, gate 273 and access door 277 are large enough to handle the removal and transport by remotely controlled means of an assembly of shock plate and shock absorber. All types of inspections and all work inside cavity 2 are accomplished by robots remotely controlled and also introduced by means of access door 277, work chamber 275 and gate 273. At the end of each cycle, before the nuclear device is introduced inside cavity 2, the ambient conditions therein are such that systematic inspections of critical parts can easily be conducted by means of such robot assistance, remotely and safely by far away personnel.

The use of an external reactor for reduction of the water by coal, as shown in FIG. 1, permits the segregation of the gaseous fuels from the radioactively contaminated steam generated inside cavity 2. Such fuels ($H_2$ and CO) can then safely be transported or piped far away for direct use, like natural gas. This fuel is free of any radioactive contamination, as is electrical current, regardless of the nature of its source. Because of the fission/fusion nuclear reactions that takes place when the nuclear device explodes, the superheated steam coming out of cavity 2 contains particles of radioactive materials. This means that the water and steam used as working fluid must not be let outside and should remain contained in a sealed volume. If two cavities 2 of 500-ft diameter are used as was assumed at the beginning of this discussion, the total amount of water required is about $3 \times 10^7$ lbs. The volume needed to store such an amount of water is only that of a 50-ft diameter sphere, or one tenth of the diameter of cavity 2. Depending upon the nature, degree and type of radioactive contamination of the superheated steam, inside of cavity 2, either one of two methods can be used to make the handling of the steam safe: (1) Use a heat exchanger between the superheated steam extracted from cavity 2 and a second working fluid (which also can be water and steam) for use in the turbines, condensers and reactor 250; and (2) Decontaminate the superheated steam as it exits cavity 2 before it is ducted to the power extracting machinery and areas to which personnel must have access. All radioactive working fluids, either in the liquid or vapor states, can thus easily be made self-contained within a closed volume and well isolated from both the environment and personnel.

Referring now to FIG. 1, as an example, heat exchanging or decontamination means 270, shown in phantom lines, are located underground between steam collection pipe 41 and steam duct 39. The fluid used to extract heat from the steam or to decontaminate it, is introduced by means of duct 272 and exits by means of duct 274. In both cases, the hot working fluid flowing out into duct 39 is neither contaminated nor radioactive, but is safe. In either case, the overall efficiency of the power plant is slightly less than that of a similar system without such features. However, the end result is a nuclear power plant that has the following features: (1) A small fracture of the energy produced is the result of fission reactions; (2) Most of the energy produced is the result of fusion reactions; (3) Only a small amount of fissionable material is used at any given time, and this material cannot cause an explosion until it is introduced inside a cavity which is specifically designed and built to accommodate an explosion several times more powerful; and (4) The total maximum yield of the nuclear device cannot exceed that yield amount for which the cavity is constructed, at any time. These features, inherent to the present invention, result in the following advantages over conventional nuclear reactors: (1) No danger of meltdown; (2) Less radioactive waste products to dispose of per unit of energy produced; (3) Lower risks of an unwanted nuclear explosion; (4) Use of a less expensive, less dangerous and almost inhexaustible fuel; (5) Lower risks of mechanical failures that could cause a major catastrophy. The first four advantages are either obvious or have been discussed earlier. The last advantage cited is somewhat less obvious, but just as much real and vital.

From the description and the discussion of the operation previously given of the present invention, one can see that all parts and components are simple and amenable to straightforward design, analysis and construction. The operation of each mechanical part with respect to others connected to it is by means such that incidental mishaps such as galling, seizing, excessive wear and leakage cannot happen or cannot cause the catastrophic failure of another system. Only the rupture of a part can cause a failure. It can easily be seen that no vital part requires engineering knowledge, techniques and materials other than what is present state-of-the-art. When the nuclear device is introduced inside cavity 2, both pressure and temperature are at their lowest values, no part and no component is moving (except for the delivery tube assembly). Unless positioned properly, the nuclear device cannot be detonated. If it were to become loose and fall on the bottom of cavity 2, it would not detonate as it is built not to rupture and not to detonate, unless triggered by means of the electrical line which would then be broken. The unexploded device could then be retrieved by remote control. It is obvious that such large cavities should be built only in regions that are free of earthquakes and in rocky ground formations that are free of faults. The influence of radiations on the strength properties of steel shell 14 and of the concrete of wall 12 can be established in advance as it is well known in the technology of nuclear reactors. The steel shell and the concrete wall can be designed and built accordingly, based on the total level of radiation exposure during the power plant lifetime. All radioactive structures, hardware and working fluids are buried deep under ground level and present less potential danger than do conventional nuclear reactors. The rocks and concrete mass in which cavity 2 is embedded plays two very basic and essential roles concurrently, those of: (1) radiation shielding, and (2) mechanical containment of any possible explosion.

The use of non-fission means to trigger the fusion reaction reduces the radiation and contamination levels considerably. If laser energy is used, the laser beam must travel to the cavity center from somewhere outside of wall 12. To minimize the degree of attenuation of the beam energy, the beam should not be made to travel through 30 to 35 ft of saturated steam at 60 psia. It is more realistic to assume that the laser beam has to travel in vacuum. If 50-ft diameter cavities are used in conjunction with the use of laser triggering, the device must then be held in place by an evacuated tube through which the laser beam can travel in vacuum. The tube then plays the role of linyard 10 of FIG. 1. However, the tube is bulkier and heavier than the linyard per unit length and per unit weight supported. It has to withstand an external pressure of 60 psi at a temperature of approximately 300° F. Its material must vaporize, mix and chemically react with the superheated steam after the explosion, all without affecting the handling and/or behavior of the working fluid, whether in the water form or steam state. Some structural plastic materials are the best candidates. In this instance, an electrical connection with the nuclear device may not be needed once it is in place, the laser beam then initiates the detonation. It is assumed that the detonation of the nuclear device can then be triggered soon after it has been positioned.

To substantiate the assumption that powerful laser beam energy can be used to successfully detonate a pure fusion nuclear device with the minimum contemplated yield of 0.01 kT, it suffices to quote the capability of a KrF laser called Sprite, developed in England, that will soon deliver 100 Joules in 1 nsec ($10^{-9}$ sec) of Ultra Violet light, with a beam divergence of less than 4 minutes of arc. This corresponds to a power level equal to about 11% of the 1000 MW of the pulsed nuclear power plant used herein as an example, but over such a short time ($10^{-9}$ sec) that the total amount of energy delivered is only approximately $0.3 \times 10^{-4}$ kWh. If a very low laser efficiency of only 1% is assumed (feasible now), the amount of energy pumped into the laser is only $0.3 \times 10^{-2}$ kWh. Even at the rate of once every 1.5 minutes, this is the equivalent of only a few kWh per day. This is present day technology (Spring of 1984). Soon, versions of the Sprite laser, 50 times more powerful, are anticipated. For comparison purpose, MIT fusion researchers have recently announced to have achieved a breakeven condition, using supercooled deuterium pellets, whereby the energy liberated by the fusion reaction is at least equal to the laser energy required to initiate the fusion process. The plasma was confined for 50 msec and the temperature reached was $17 \times 10^{6°}$ C. This, however, does not reflect the other two paramount problems of steady plasma containment and of the energy extraction from such plasma.

In the present invention, the laser beam must travel a minimum of at least 30-35 ft to reach the nuclear device, in the case of the smallest cavity size (50-ft diameter). The evacuated tube used to position the nuclear device and channel the laser beam has an inside diameter larger than the beam diameter, because all of the beam energy must reach its target (the nuclear device fuel). However, the plasma generated by the fusion reaction, and that penetrates inside the holding tube, encounters no steam to isolate it from the holding tube wall inner surface and from any hardware on its path outward. This plasma travels at a velocity much higher than that of the shock wave in the steam and expands longitudinally along the tube length. The plasma touches the tube inner wall and two main effects result: (1) pressure is applied from inside the tube on its wall, and (2) material ablates away from the tube wall inner surface. The first effect can be ignored because the mechanical reaction time of the tube wall material to the pressure loading is much larger than another reaction time of major interest. The ablation of material from the tube wall inner surface instantly generates a high intensity compression wave in the tube wall. This stress wave moves outwardly within the tube wall, reaches the tube wall outer surface, some material spalls off and part of the compression stress wave is reflected back as a tension stress wave. The chronology of the ensuing phenomenological events is irrelevant: the tube is left with no structural integrity, although its material has hardly moved. The external sweeping shock wave travelling in the steam outside of the tube wall, with a time lag, arrives behind, collapses that material and implodes it at the holding tube centerline. There is no doubt that the tube material is, by then, on its way to total physical disintegration, which is desired and programmed. The proper choice of plastic material, for the tube wall, further insures that its debris vaporize, mix and chemically react with the superheated steam, so that, with time, no unwanted material accumulates inside cavity 2.

The problem of handling the plasma jet that finally reaches the loading end of the nuclear device delivery tube remains to be solved. By the time the plasma reaches this point, it has somewhat cooled off, but still travels very fast and has a considerable amount of kinetic energy. Attempting to close gates and to absorb the resulting shock, and thus to protect the laser machinery, is not practical, for lack of time. It is simpler and more feasible to deflect the emerging plasma jet and let it expand into a vacuum chamber where its energy can be dissipated by ablating material from the inner surface of the walls of such chamber. However, before the shock wave in the steam reaches the nuclear device loading mechanism station, outside of cavity 2 wall, the plasma jet has long gone by and enough time is available then to close the delivery tube opening needed at its upper end to let the plasma pass by. This plasma and the ablation products now trapped in the vacuum chamber earlier mentioned are further cooled down by the injection of water. The steam thus produced and the cooled down mixture of plasma and ablation debris are injected back into cavity 2 to mix with the superheated steam therein. None of this vapor mixture is ever allowed to leave the containment volume of the working fluid. If some particulate matter were to remain unvaporized (or become recondensed from an earlier vaporized form) in the superheated steam, after each explosion, this particulate matter would gather at the bottom of each cavity 2, where it can do no harm.

Energy is needed on an ever increasing scale. Also, it will never be all needed in one single form or obtainable from one single source. It will most likely be always needed in the basic forms of gaseous fuels, liquid fuels, solid fuels and electricity. The present invention provides the means for liberating energy, in the near future, in the form of heat to produce: (1) electricity, (2) carbon monoxide, and (3) hydrogen; by using three sources of plentiful inexpensive basic materials: (1) water, (2) heavy water, and (3) coal. It takes electrical energy and water to produce heavy water and then to extract and produce deuterium and tritium from heavy water; and electrical energy and liquid fuels to extract and process coal. However, the ratio of the amount of energy generated by the fusion of one unit weight of deuterium/tritium optimal mixture to the amount of energy required to produce that unit weight of the same mixture is extremely large. It is such that the combination of electrical energy, coal (or carbon monoxide) and hydrogen can economically be contemplated to produce hydrocarbons by hydrogenizing carbon. When electrical energy can be produced inexpensively, safely and without creating environmental risks, as seems to be the case of the present invention, a pulsed nuclear power plant can become the means for creating a new source of fuels. Further, such new liquid hydrocarbons can also be used as raw materials for the production of plastics, which has so far made a heavy demand on crude oil supplies. It appears that the present invention provides a path toward the national goal of becoming energy independent, meaning not dependent upon: (1) imported crude oil, and (2) the potential depletion of our own crude oil and natural gas reserves.

How practical, reliable and economical is the construction of twin 500-ft diameter cavities underground, pressurized to a peak pressure of 3,000 psi? How many suitably located and acceptable such sites are there in the Continental US? Whatever the answers are, better answers can be obtained if the questions are rephrased to say 20 50-ft diameter cavities, instead of 2 500-ft diameter cavities. This corresponds to hardly more than a section of a large size tunnel, less than a quarter of a mile long. Most of the hoop tension loads created in the wall of any such size container by 3,000-psi internal pressure must be absorbed by the reinforced, pre-stressed concrete shell that surrounds the cavity. The function of the steel shell is mostly that of a seal and of a support for the mechanical attachments of components and ducts. However, some of the pre-stressed concrete loading must be transmitted to the rocks in which the whole system is embedded, to the degree that such rock can safely withstand compression without crushing. The tension loading of the rock must be minimized. A height of solid rock at least equal to the cavity diameter should suffice. This alone is a major reason for wanting to reduce the cavity size appreciably below 500 ft. Also, the use of several smaller cavities allows to have one cavity as spare, so that: (1) each cavity can periodically be the spare, in turn, and available for complete scheduled inspections and repairs, annually for instance; (2) a mishap in one operating cavity does not cause a lowering of the generated power level; and (3) a shut down of the whole plant should never be required.

The pulsed nuclear power plant herein described offers definite advantages over both conventional power nuclear reactors and fusion concepts that are based on plasma containment and direct energy extraction from such plasma. Power plants as per the present invention can be built and operated with the use of present day technology and state-of-the-art engineering. The risks and dangers to personnel and the environment are low. The fuel supply is practically inexhaustible, available everywhere and inexpensive. The end products can be delivered in various forms: electricity, more fuels and raw hydrocarbon materials. The end result is a safe and reliable power plant that uses an inexpensive fuel contained in water and coal which is plentiful within the Continental US, then produces electrical energy and, in addition, becomes the source of more conventional hydrocarbons to replace crude oil, creating thereby a new natural resource.

Having thus described my invention, I claim:

1. A nuclear power plant comprising:
   means for defining a cavity;
   means for introducing and positioning a detonatable nuclear device in a central region of the cavity;
   means for introducing a working fluid inside of the cavity;
   means for detonating the nuclear device inside of the cavity;
   mechanical means projecting from an interior wall of the cavity for recoiling to absorb a shock wave produced by the detonation of the nuclear device and thereby protect the cavity from damage, including a plurality of segments defining a shell within the cavity and a plurality of shock absorbers each connecting a corresponding segment to a corresponding location on the wall of the cavity, each of the shock absorbers having means for regulating the recoil action of the segments; and
   means for permitting controlled extraction of a quantity of hot gases from the cavity produced by the vaporization of the working fluid upon detonation of the nuclear device.

2. A nuclear power plant according to claim 1 wherein the cavity is an underground cavity.

3. A nuclear power plant according to claim 1 and further comprising means connected to the controlled extraction means for converting the energy in the hot gases into mechanical energy.

4. A nuclear power plant according to claim 1 and further comprising means for introducing a particulate carbon based fuel into the cavity.

5. A nuclear power plant according to claim 4 and further comprising means connected to the controlled extraction means for burning a gas produced by the reaction of the working fluid and the carbon based fuel upon detonation of the nuclear device.

6. A nuclear power plant according to claim 1 wherein the shell segments are constructed to form openings in the shell for permitting a portion of the shock wave to travel past the shell segments at the time of the interaction of the shock wave with the segments, thereby reducing the strength of the shock wave reflected by the shell.

7. A nuclear power plant according to claim 1 wherein the nuclear device is of the fission type.

8. A nuclear power plant according to claim 1 wherein the nuclear device is of the fission-fusion type, whereby the fission reaction initiates and triggers the fusion reaction.

9. A nuclear power plant according to claim 1 wherein the nuclear device is of the fusion type and wherein the fusion reaction is initiated by non-nuclear means located externally to the nuclear device.

10. A nuclear power plant according to claim 1 wherein the shock absorber means for regulating the recoil action of the segments includes:
 means for absorbing and dissipating the kinetic energy delivered to the segments by the shock wave interaction therewith;
 means for guiding the segments during their outwardly directed travel toward the cavity wall after the detonation;
 means for flexibly attaching the shock absorbers to the corresponding segments;
 means for rigidly attaching the shock absorbers to the corresponding location on the cavity wall;
 means for clamping and holding the segments in place at the end of their outwardly directed travel;
 means for releasing the segments from their clamped positions and for controllably monitoring their return to the original location occupied prior to the detonation of the nuclear device; and
 means for slowly and safely repositioning the segments to redefine the shell prior to the subsequent detonation of the next nuclear device.

11. A nuclear power plant according to claim 1 wherein the interior wall of the cavity includes:
 means for permitting access into the cavity when it is not in operation; and
 means for closing, securing, protecting and sealing said access means when the cavity is normally operating.

12. A nuclear power plant according to claim 1 wherein the working fluid is steam and further comprising:
 means for introducing the superheated steam resulting from the nuclear device detonation into a reactor located externally to the cavity;
 means for introducing particulate carbon into the reactor;
 means for heating the mixture of superheated steam and particulate carbon at a pressure and to a temperature such that the chemical reaction between the steam and the carbon produces the maximum quantity of carbon monoxide and hydrogen in an excess of superheated steam; and
 means for controllably extracting the mixture of carbon monoxide, hydrogen and excess superheated steam from the reactor.

13. A nuclear power plant according to claim 1 wherein the means for introducing and positioning the nuclear device within the cavity includes:
 a delivery passage communicating with the interior wall of the cavity;
 means for transporting the nuclear device through the passage;
 means for protecting and sealing the passage; and
 means for deflecting the shock wave from the passage opening into the cavity through the shell.

14. A nuclear power plant according to claim 1 wherein the means for introducing the working fluid includes a plurality of injection tubes positioned between adjacent ones of the segments of the shell.

15. A nuclear power plant according to claim 1 wherein the cavity and the shell are both generally spherical and the shell is located concentrically within the cavity interior wall.

16. A nuclear power plant according to claim 1 wherein the shell consists of a plurality of flat segments adjacently and contiguously positioned, thereby giving the shell a multi-faceted quasi-spherical shape.

17. A method of generating power, comprising the steps of:
 introducing a quantity of water in an underground cavity;
 heating the water in the cavity to form saturated steam;
 detonating a nuclear device at a central location inside the cavity;
 recoiling a plurality of plate-like elements inside the cavity away from the central location in a mechanically regulated and controlled manner to absorb a shock wave produced by the nuclear device detonation and thereby protect the underground cavity against damage;
 extracting a quantity of superheated steam produced by the detonation of the nuclear device; and
 converting the energy in the extracted superheated steam into electrical power.

18. A method of generating power, comprising the steps of:
 providing a mixture of saturated steam and particulate coal into an underground cavity;
 detonating a nuclear device at a central location inside the cavity;
 recoiling a plurality of plate-like elements inside the cavity away from the central location in a mechanically regulated and controlled manner to absorb a shock wave produced by the detonation and thereby protect the cavity against damage; and
 extracting a quantity of carbon monoxide and hydrogen mixture resulting from the reaction of the steam with the coal and caused by the energy released by the detonation of the nuclear device.

19. The method of generating power as recited in claim 17 and further comprising the steps of:
 introducing a quantity of the superheated steam extracted from the cavity and particulate coal in a reactor located externally to the cavity;
 heating the steam-coal mixture at a pressure and to a temperature such that the coal and the steam optimally react chemically to produce a mixture of carbon monoxide and hydrogen in an excess of superheated steam; and
 extracting the mixture of carbon monoxide, hydrogen and excess superheated steam from the reactor.

* * * * *